US011156376B1

(12) United States Patent
Grant

(10) Patent No.: US 11,156,376 B1
(45) Date of Patent: **\*Oct. 26, 2021**

(54) SYSTEMS AND METHODS FOR MITIGATING SMOKE DAMAGE TO A PROPERTY

(71) Applicant: State Farm Mutual Automobile Insurance Company, Bloomington, IL (US)

(72) Inventor: Rosemarie G. Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/777,370

(22) Filed: Jan. 30, 2020

Related U.S. Application Data

(63) Continuation of application No. 16/255,134, filed on Jan. 23, 2019, which is a continuation of application
(Continued)

(51) Int. Cl.
*F24F 11/30* (2018.01)
*G08B 17/10* (2006.01)
(Continued)

(52) U.S. Cl.
CPC .......... *F24F 11/30* (2018.01); *F24F 11/0001* (2013.01); *F24F 11/62* (2018.01);
(Continued)

(58) Field of Classification Search
CPC .. F24F 11/0017; F24F 11/0001; F24F 11/006; F24F 11/0086; F24F 11/0009; F24F 2011/0019; F24F 2011/0023; F24F 2011/0024; F24F 2011/0069; F24F 2011/0071; F24F 2011/0095; F24F 2011/0097; F24F 2011/0098; F24F 11/30;
(Continued)

(56) References Cited

U.S. PATENT DOCUMENTS

| 4,977,818 A | 12/1990 | Taylor et al. |
| 5,394,934 A | 3/1995 | Rein et al. |

(Continued)

*Primary Examiner* — An T Nguyen
(74) *Attorney, Agent, or Firm* — Armstrong Teasdale LLP

(57) ABSTRACT

Smoke and/or soot damage to an interior of a property, such as a residential building or home, may be mitigated. A controller is in communication with a heating, ventilation, and air conditioning (HVAC) system of the property. The controller is configured to receive an alert and/or intelligent home telematics data generated based upon a potential presence of smoke in a location associated with the property, either exterior or interior to the property. In response to receiving the alert and/or intelligent home telematics data, the controller is further configured deactivate an air circulation function of the HVAC system to mitigate smoke or fire damage to the property. The intelligent home telematics data may be generated by various smoke, fire, audio, visual, infrared, motion, and/or other smart sensors mounted about the interior and/or exterior of the property.

20 Claims, 8 Drawing Sheets

Related U.S. Application Data

No. 15/632,859, filed on Jun. 26, 2017, now Pat. No. 10,253,995.

(60) Provisional application No. 62/452,721, filed on Jan. 31, 2017, provisional application No. 62/454,160, filed on Feb. 3, 2017, provisional application No. 62/469,849, filed on Mar. 10, 2017.

(51) Int. Cl.
| | |
|---|---|
| *F24F 11/62* | (2018.01) |
| *F24F 11/00* | (2018.01) |
| *F24F 11/35* | (2018.01) |
| *F24F 110/64* | (2018.01) |
| *F24F 110/52* | (2018.01) |
| *F24F 11/34* | (2018.01) |
| *F24F 11/58* | (2018.01) |
| *F24F 110/62* | (2018.01) |
| *F24F 11/33* | (2018.01) |
| *F24F 11/57* | (2018.01) |

(52) U.S. Cl.
CPC .............. G08B 17/10 (2013.01); *F24F 11/33* (2018.01); *F24F 11/34* (2018.01); *F24F 11/35* (2018.01); *F24F 11/57* (2018.01); *F24F 11/58* (2018.01); *F24F 2110/52* (2018.01); *F24F 2110/62* (2018.01); *F24F 2110/64* (2018.01)

(58) Field of Classification Search
CPC ........ F24F 11/62; F24F 2110/62; F24F 11/58; F24F 11/35; F24F 11/57; F24F 2110/64; F24F 11/33; F24F 2110/52; F24F 11/34; G08B 17/10; G08B 17/06; G08B 15/02; G08B 21/14; H04L 12/2816

See application file for complete search history.

(56) References Cited

U.S. PATENT DOCUMENTS

| | | | |
|---|---|---|---|
| 5,950,150 A | 9/1999 | Lloyd et al. | |
| 6,496,110 B2 | 12/2002 | Peterson et al. | |
| 6,590,496 B2 | 7/2003 | Peterson et al. | |
| 6,776,708 B1* | 8/2004 | Daoutis | F24F 7/06 454/229 |
| 7,102,529 B2* | 9/2006 | Whitney | A62C 2/24 340/628 |
| 7,169,039 B2 | 1/2007 | Oppedisano et al. | |
| 7,481,261 B2 | 1/2009 | Johnson et al. | |
| 7,696,891 B2 | 4/2010 | Whitney | |
| 7,994,928 B2 | 8/2011 | Richmond | |
| 9,819,428 B2 | 11/2017 | Iwai et al. | |
| 10,253,995 B1* | 4/2019 | Grant | F24F 11/0001 |
| 10,726,695 B1* | 7/2020 | Blincoe | H04W 4/33 |
| 2002/0155807 A1* | 10/2002 | Moor | F24F 7/007 454/342 |
| 2005/0046563 A1 | 3/2005 | Whitney | |
| 2005/0078003 A1 | 4/2005 | King | |
| 2006/0106499 A1 | 5/2006 | Roosli et al. | |
| 2006/0255957 A1 | 11/2006 | Whitney | |
| 2008/0182506 A1 | 7/2008 | Jackson et al. | |
| 2010/0307600 A1* | 12/2010 | Crucs | E03B 7/071 137/2 |
| 2012/0079092 A1* | 3/2012 | Woxblom | H04L 65/80 709/223 |
| 2014/0049107 A1* | 2/2014 | Marx | H02J 4/00 307/31 |
| 2015/0031277 A1 | 1/2015 | Khera et al. | |
| 2015/0100166 A1 | 4/2015 | Baynes et al. | |
| 2015/0294543 A1* | 10/2015 | Ricks | G08B 27/003 340/541 |
| 2017/0103491 A1 | 4/2017 | Bora et al. | |
| 2017/0103633 A1 | 4/2017 | Khire et al. | |
| 2017/0134895 A1* | 5/2017 | Rabb | G08B 29/24 |
| 2017/0176961 A1* | 6/2017 | Tirpak | G05B 15/02 |

\* cited by examiner

SYSTEMS AND METHODS FOR MITIGATING SMOKE DAMAGE TO A PROPERTY

RELATED APPLICATIONS

This application is a continuation of, and claims the benefit of, U.S. patent application Ser. No. 16/255,134, filed Jan. 23, 2019 and entitled "Systems and Methods for Mitigating Smoke Damage to a Property," which is a continuation of, and claims the benefit of, U.S. patent application Ser. No. 15/632,859 (now U.S. Pat. No. 10,253,995), filed Jun. 26, 2017 and entitled "Systems and Methods for Mitigating Smoke Damage to a Property," which claims the benefit of priority to U.S. Provisional Patent Application No. 62/452,721, filed Jan. 31, 2017, entitled "SYSTEMS AND METHODS FOR MITIGATING SMOKE DAMAGE TO A PROPERTY," to U.S. Provisional Patent Application No. 62/454,160, filed Feb. 3, 2017, entitled "SYSTEMS AND METHODS FOR MITIGATING SMOKE DAMAGE TO A PROPERTY," and to U.S. Provisional Patent Application No. 62/469,849, filed Mar. 10, 2017, entitled "SYSTEMS AND METHODS FOR MITIGATING SMOKE DAMAGE TO A PROPERTY," the entire contents and disclosure of which are hereby incorporated by reference in their entirety.

FIELD OF THE DISCLOSURE

The present disclosure relates to mitigating smoke damage to a property and, more particularly, to systems and methods for controlling a ventilation system at a property for mitigating smoke and soot damage to a property, such as a residential property.

BACKGROUND

Fire damage is not the sole concern in the event of a fire within or near a property. Although smoke, ash, and soot damage to a home may not cause significant physical damage to the home, it may be difficult and costly to clean and/or repair, and, in some cases, items may need to be replaced. In the case of wildfires, for example, smoke and soot damage may occur within a property from a wildfire many miles away. In the case of interior smoke and/or fires (e.g., generated during cooking), smoke may make its way through a building to rooms other than those in which the smoke and/or fire originated. In particular, Heating, Ventilation, and Air Conditioning (HVAC) systems within a building may continue to circulate air even when doing so can spread smoke, ash, and/or soot throughout the building. Especially in newer construction, HVAC systems may use an exterior intake to circulate air throughout the building, which may bring smoke originating outside the building into the building.

BRIEF SUMMARY

The present embodiments may relate to systems and methods for controlling a heating, ventilation, and air conditioning (HVAC) system to mitigate smoke, ash, and/or soot damage to a property. As used herein, a "property" may refer to a home, a residence, an apartment, a condominium, a business, or any other building. A controller within the property may receive an alert generated (e.g., by one or more sensors or by an emergency service) based upon a potential presence of smoke in a location associated with the property and, in response to the alert, deactivate an air circulation function of the HVAC system, to stop the HVAC system from circulating air through the property. The alert may include an emergency (e.g., wildfire) alert from emergency services (e.g., the National Weather Service (NWS)). Additionally or alternatively, the alert may include an audio signal and/or an alternative alert generated by an activated smoke detector within the property. The controller may additionally or alternatively receive and/or analyze smart home telematics data collected by one or more sensors within and/or around the property to determine whether smoke, fire, ash, and/or soot are present. To deactivate the air circulation function of the HVAC system, the controller may deactivate, for example, a blower component and/or a heat exchanger of the HVAC system to stop the blower component from blowing air through ductwork of the HVAC system and/or the heat exchanger from bringing in dirty air from outside the property. Additionally or alternatively, the controller may deactivate at least one of a furnace unit, an air conditioner unit, and a fan unit. In some embodiments, the controller may activate one or more dampers within the ductwork to prevent air from passing through the ductwork.

In one aspect, a controller for controlling an HVAC system to mitigate smoke damage to a property may be provided. The controller may be in communication with the HVAC system. The controller may include one or more processors in communication with a memory device. The one or more processors may be programmed to (i) receive an alert generated based upon a potential presence of at least one of smoke and fire in a location associated with the property, and (ii) in response to receiving the alert, deactivate an air circulation function of the HVAC system. The one or more processors may be programmed to perform additional, fewer, and/or alternative functions.

In another aspect, a method for controlling an HVAC system to mitigate smoke damage to a property may be provided. The method may be implemented using a controller in communication with the HVAC system. The method may include (i) receiving, by the controller, an alert generated based upon a potential presence of at least one of smoke and fire a location associated with the property, and (ii) in response to receiving the alert, deactivating, by the controller, an air circulation function of the HVAC system. The method may include additional, fewer, and/or alternative steps.

In a further aspect, at least one non-transitory computer-readable storage medium may be provided. The non-transitory storage medium may have computer-executable instructions embodied thereon, wherein when executed by at least one processor of a controller in communication with an HVAC system of a property, the computer-executable instructions may cause the at least one processor to: (i) receive an alert generated based upon a potential presence of at least one of smoke and fire in a location associated with the property, and (ii) in response to receiving the alert, deactivate an air circulation function of the HVAC system. The computer-executable instructions may cause the at least one processor to perform additional, fewer, and/or alternative functions.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
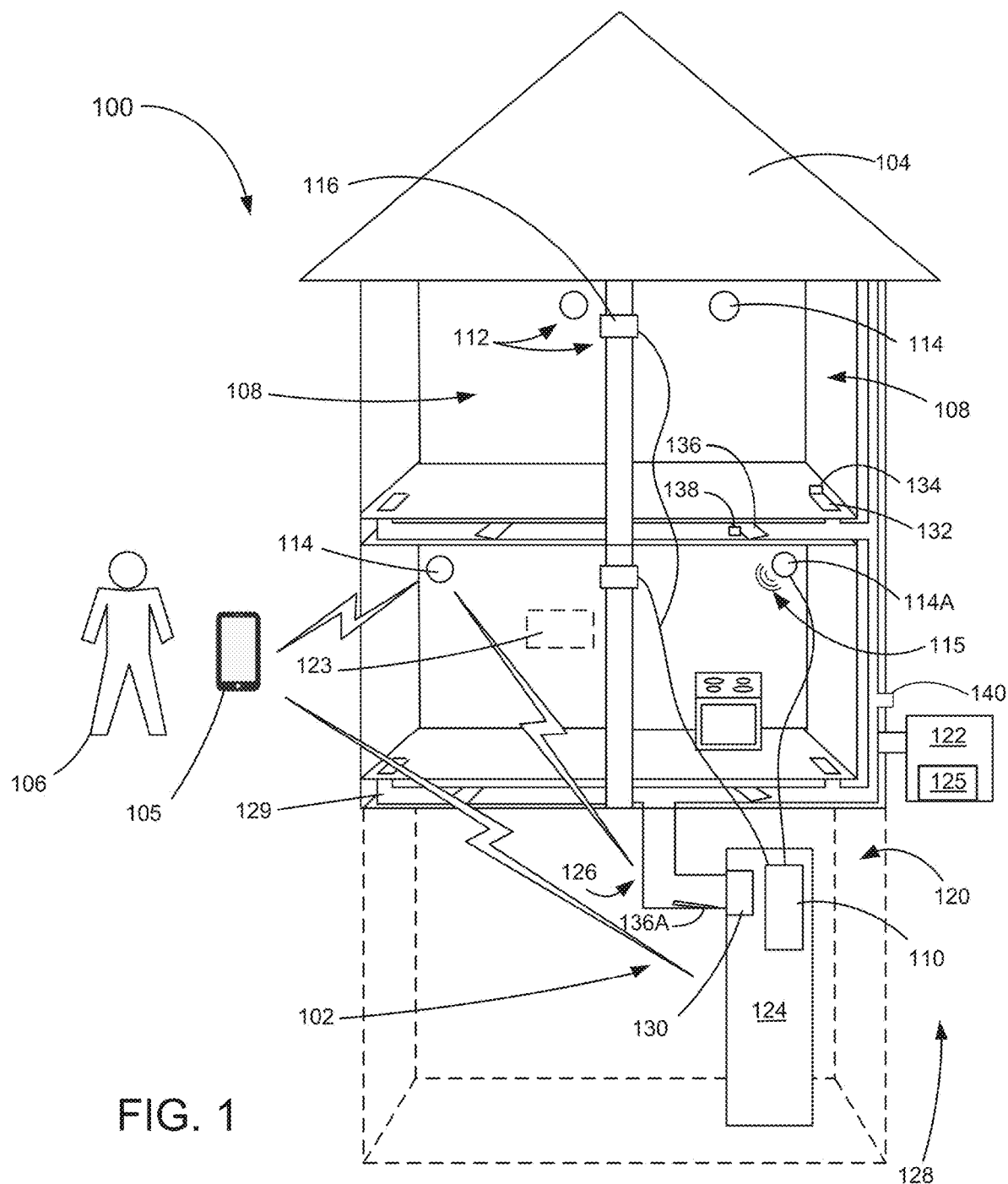
FIG. 1 depicts an exemplary building environment in which an exemplary control system control a heating, ventilation, and air conditioning (HVAC) system to mitigate smoke and/or soot damage to a property.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for controlling an HVAC system. The control system described herein includes a controller, which may be communicatively coupled to one or more components of the HVAC system. The controller may be configured to receive an alert generated based upon the presence (or potential presence) of smoke, fire, ash, and/or soot in a location associated with the property, where the smoke, fire, ash, and/or soot may present the potential for damage to the interior of the property. The controller, in response to the received alert, may deactivate an air circulation function of the HVAC system, thereby preventing air from circulating throughout the property to mitigate smoke/soot/ash damage to the property.

In the exemplary embodiment, the control system may be implemented within a property, such as a residential structure (e.g., a home). The property may further include one of more HVAC systems that are designed to circulate air within the property. If smoke, fire, ash, or soot is within the property, circulating air may circulate smoke from affected areas to unaffected areas, thus spreading smoke damage. The control system described herein may be implemented to function in at least two scenarios. First, the control system may function to mitigate smoke damage from a smoke event internal to the property, such as a cooking fire. In such circumstances, a controller of the control system may be configured to utilize sound detection to detect an alarm generated by a smoke detector in response to detecting smoke/soot/fire/ash within the property. Second, the control system may function to mitigate smoke damage from a smoke event external to the property, such as a wildfire, which may generate smoke plumes. In such circumstances, the controller may be configured to receive emergency alerts, such as weather alerts or radio alerts generated by the National Weather Service (NWS) or National Oceanic and Atmospheric Administration (NOAA). The alert, in each of these scenarios, may be an alert generated by at least one of: (i) a device exterior to the property, (ii) a device within the property and exterior to the HVAC system, and (iii) a device within the property and within the HVAC system. More particularly, in at least one exemplary embodiment, the alert may include an alert generated by at least one of: (i) a device exterior to the property, and (ii) a device within the property and exterior to the HVAC system. In other words, the controller receives alerts generated by other devices in response to those devices sensing smoke/soot/fire/ash or in response to a potential presence of smoke/soot/fire/ash.

Upon activation (e.g., receiving an alert), the control system described herein may halt and/or hamper any HVAC air circulation mechanisms, both active and/or passive, to prevent smoke from being spread within the property. For example, the controller may be configured to automatically disconnect power to one or more electrical components of the HVAC system to deactivate the air circulation function of the HVAC system. As described further herein, active air circulation mechanisms may include a blower or fan, and passive air circulation mechanisms may include the unassisted movement of air through ductwork. The control system may additionally or alternatively be configured to automatically deactivate one or more other components of a property that may circulate and/or provide access for smoky/sooty/ashy air to enter the property, such as an exhaust fan (e.g., a whole-house exhaust, bathroom exhaust, stove hood exhaust) or clothes dryer with an exterior vent.

In addition, the controller may be configured to reactivate the air circulation function of the HVAC system under prescribed conditions. For example, if the controller determines that a smoke event has passed (e.g., the controller does not receive any smoke detector alarms for fifteen minutes), the controller may automatically reactivate the air circulation function. In some embodiments, "Smart Home" or Internet of Things (IoT) technology may be used to modify user preferences, such as how long the controller waits to reactivate the air circulation function, preferences for when a user wishes to be notified of the controller functions, and/or additional settings or preferences.

In some embodiments, the control system described herein may be provided as part of a "Smart Home" system including a plurality of "smart" or interconnected computing devices. The control system may be interconnected to one or more other computing devices via a wired and/or wireless connection, such that a user of the control system (e.g., a homeowner) may be able to control one or more parameters or settings of the control system using a control panel and/or a connected "smart" user computing device, such as a smart phone, personal computer, or tablet. "Smart Home" systems may include, for example, security systems, interior and/or exterior lighting systems, garage door systems, utility monitoring systems, programmable HVAC systems, exhaust fans, appliances (e.g., ovens, stoves, washing machines, dryers, etc.), smart home controllers or command devices (e.g., Amazon Echo®, Google Home®, etc.), and/or a plurality of other systems and/or computing devices. In addition, the "Smart Home" system may include one or more sensors, such as smart sensors, configured to collect smart home telematics from locations within and around the property.

Exemplary sensors placed about a home and/or embedded within building or construction materials (such as embedded throughout construction materials and/or embedded within certain or limited amounts of construction materials that are used at specific or strategic locations within the home) are shown in the Figures and discussed further below. The sensors may be "smart sensors" and each may include one or more types of sensors (smoke, temperature, sound/audio signal, wind, light, ozone, pollutants, etc.), processors, power units, batteries, clocks, Global Positioning System (GPS) units, memory units, instructions, clocks, actuators, transmitter, receivers, transceivers, other electronic components, miniature electronics and circuitry, etc. Each smart sensor may be configured for wireless radio frequency (RF) communication and/or data transmission, and/or for wired data transmission, to other devices (such as via wireless communication or data transmission over one or more radio frequency links or digital communication channels), such as the controller, user computing devices, smart home controllers, and/or remote servers, such as remote servers associated with insurance providers. The data collected by the smart sensors, and/or other sensors mounted on the interior or exterior of a home or other property may be characterized as intelligent home telematics data or smart home telematics data.

Systems and methods are described herein for controlling an HVAC system to mitigate smoke, ash, and/or soot damage to a building, such as a residential house. In one embodiment, a control system may be provided. The control system may include a controller configured to: (i) receive an alert generated based upon a potential presence of at least one of smoke and fire in a location associated with the property, and/or (ii) in response to receiving the alert, deactivate an air circulation function of the HVAC system. Additionally or alternatively, the control system may include a controller configured to: (i) receive smart home telematics data (such as data generated or collected by smoke, fire, soot, ash, audio, visual, video, and/or other smart sensors mounted about the interior and/or exterior of a home), (ii) analyze the home telematics data to identify any indicators of a potential presence of smoke and/or fire in a location associated with the property, and/or (iii) in response to identifying any indicators of smoke and/or fire, deactivate an air circulation function of the HVAC system.

At least one of the technical problems addressed by this system may include: (i) increased smoke, ash, and/or soot damage to a home due to air circulation during a smoke/soot/ash event; (ii) difficulty in manually mitigating and/or preventing smoke damage; (iii) difficulty detecting and responding to a smoke/soot/ash event when not present within a property; and/or (iv) increased costs in cleaning/repairing smoke damage to effected properties.

The technical effect achieved by this system may be at least one of: (i) prompt detection of smoke events; (ii) prompt mitigation of smoke damage in response to detected smoke events; (iii) automatic and improved response to smoke events without manual intervention; (iv) decreased risk of smoke/soot/ash damage in properties near to smoke/soot/ash events; and/or (v) reduced cost in cleaning/repairing smoke damage to effected properties. Other technical effects may include the intersection of wireless communication (such as between sensors, response control computing devices, and/or insurance provider remote servers) and insurance-related activities (such as generating recommendations that alleviate potential smoke/soot/ash damage, and/or update insurance policies, premiums, discounts, and/or rates based upon a more accurate and up-to-date picture of insurance-related risk, or lack of risk, due to smoke/soot/ash prevention within a home or other building).

Exemplary Control System for Controlling an HVAC System to Mitigate Smoke Damage to a Property FIG. 1 depicts an exemplary building environment 100 in which a control system 102 monitors a property 104, such as a residential home of a property owner ("homeowner") 106, for the presence of smoke in a location associated with property 104. In the exemplary embodiment, control system 102 may include a response control computing device 110, also referred to as a "controller" 110, and a plurality of sensors 112 deployed (and/or mounted or embedded) throughout property 104. Sensors 112 may include, broadly, any kind of sensor 112 (e.g., smoke, temperature, sound/audio signal, light, wind, motion, video, ozone, pollutant, etc.). The data generated and/or collected by the smart or other sensors 112 may be characterized as smart home telematics data. In the exemplary embodiment, sensors 112 specifically include smoke detectors 114 and audio signal sensors 116, as described further herein.

In the exemplary embodiment, property 104 may include an HVAC system 120. HVAC system 120 is configured to circulate air (e.g., heated and/or conditioned air, in some embodiments) throughout property 104. More specifically, in the illustrated embodiment, HVAC system 120 may include an air conditioning unit 122, a furnace unit 124, and ductwork 126. Air conditioning unit 122 may be configured to condition and/or cool air from an environment 128 external to property 104 and to circulate the conditioned and/or cooled air through ductwork 126 to one or more rooms 108 of property 104.

Furnace unit 124 may be configured to heat air from environment 128 and to circulate the heated air through ductwork 126 to one or more rooms 108 of property 104. In the exemplary embodiment, furnace unit 124 may include a blower component 130 configured to force air (e.g., heated air) from furnace unit 124 through ductwork 126. Blower components 130 may include, for example but without limitation, a bladed fan, a bladeless fan, an axial-flow fan, a centrifugal-flow fan, a bellows component, a compressor, a convective circulation unit, an electrostatic fluid accelerator, and/or any other component that induces air flow.

Air conditioning unit 122 may additionally or alternatively include a blower component similar to blower component 130. In some embodiments, one of air conditioning unit 122 and furnace unit 124 may be activated to bring a temperature of air within property 104 to a desired (e.g., predetermined by a user such as homeowner 106) temperature. The desired temperature may be set and/or programmed using a thermostat 123 and/or alternative control device (e.g., a user computing device 105 of homeowner 106). It should be understood that one of air conditioning unit 122 and furnace unit 124 may be used to circulate "un-conditioned" or "environmental" air throughout property 104 using a blower component 130. In other words, one of air conditioning unit 122 and furnace unit 124 may circulate air directly from environment 128 into property 104, without heating, conditioning, and/or cooling thereof (e.g., using a "fan" function of one of air conditioning unit 122 and furnace unit 124).

At least one of air conditioning unit 122 and furnace unit 124 may include one or more air-to-air heat exchangers 125 to supply air to property 104. Heat exchanger(s) 125 may include a heat recovery ventilator (HRV) and/or an energy recovery ventilator (ERV). Heat exchanger(s) 125 may include filters therein.

Ductwork 126 may include a plurality of ducts 129 that are disposed throughout property 104 to channel air therethrough, into rooms 108 of property 104. In some embodiments, ducts 129 may be positioned within the walls, ceilings, and/or floors of property 104. Additionally or alternatively, ducts 129 may be positioned adjacent the walls, ceilings, and/or floors of property 104 (e.g., ducts 129 may be exposed). In the exemplary embodiment, ducts 129 commence at furnace unit 124 and/or air conditioning unit 122 and terminate at one or more vents 132.

Vents 132 may be disposed within the walls, ceilings, and/or floors of property 104. More particularly, vents 132 may be arranged such that each room 108 of property 104 has at least one duct 129 terminating thereat, such that each room 108 receives air circulation via HVAC system 120. Vents 132 may each include at least one actuator 134, wherein actuator 134 is used to control air flow through vent 132. For example, homeowner 106 may manually manipulate actuator 134 to close vent 132, thereby restricting and/or preventing airflow through that vent 132, or open vent 132, thereby enabling airflow through that vent 132. In some embodiments, actuator 134 may be remotely controllable, for instance, using controller 110 (and/or user computing device 105). For example, actuator 134 may include a receiver and/or transceiver (not shown) configured to receive wired and/or wireless control signals that cause actuator 134 to close and/or open vent 132.

In addition, in some embodiments, one or more ducts 129 include a damper 136 therein. A damper 136 is configured to restrict and/or prevent airflow therepast, within the respective duct 129 in which damper 136 is located. Dampers 136 may include panels of vapor-impermeable material and may include one or more sealing components along edges thereof, such that a damper 136 may create a vapor-impermeable seal in a duct 129 when damper 136 is activated. Dampers 136 may each include at least one actuator 138, wherein actuator 138 is used to control the position of the respective damper 136.

Actuator 138 may be remotely controllable, for instance, using controller 110 (and/or user computing device 105). For example, actuator 138 may include a receiver and/or transceiver (not shown) configured to receive wired and/or wireless control signals that cause actuator 138 to activate damper 136 (i.e., cause damper 136 to restrict and/or prevent airflow therepast) and/or deactivate damper 136 (i.e., cause damper 136 to enable airflow therepast). In some embodiments, each damper 136 may include an independently controller actuator 138 such that each damper 136 may be independently activated and/or deactivated. In other embodiment, the actuators 138 of all dampers 136 may be collectively controlled, such that all dampers 136 are activated and/or deactivated at once.

HVAC system 120 may further include one or more combustion makeup vents 140. Makeup vents 140 may provide air for combustion in gas-fired appliances, such as furnaces (e.g., furnace unit 124), water heaters, dryers, and/or non-sealed gas fireplaces. Each makeup vent 140 in property 104 may have a specific damper 136 (not specifically shown with respect to illustrated makeup vent 140) associated therewith.

In the exemplary embodiment, controller 110 may be in communication with one or more components of HVAC system 120 such that controller 110 can control operation of one or more component of HVAC system 120. In one embodiment, controller 110 may be coupled to and/or adjacent to furnace unit 124, such that controller 110 is accessible within property 104 and may be in wired and/or wireless communication with furnace unit 124. In another embodiment, controller 110 may be remote from furnace unit 124, such as coupled to and/or integral to thermostat 123 or a smart-home controller (not shown) within property 104. In still other embodiments, controller 110 may be coupled to air conditioning unit 122 and/or otherwise exterior to property 104.

Irrespective of the location of controller 110, controller 110 may be in wired and/or wireless communication with one or more components of HVAC system 120 (e.g., via one or more receivers, transmitters, and/or transceivers within controller 110 and/or one or more components of HVAC system 120) such that controller 110 may receive signals from and/or transmit control signals to one or more components of HVAC system 120 (such as via wireless communication or data transmission over one or more radio frequency links or digital communication channels). For instance, controller 110 may receive signals from and/or transmit signals to one or more of air conditioning unit 122, furnace unit 124, blower component 130 (of air conditioning unit 122 and/or of furnace 124), heat exchanger 125 (of air conditioning unit 122 and/or of furnace unit 124) vents 132 (e.g., via actuators 134), and/or dampers 136 (e.g., via actuators 138).

As described further herein, controller 110 may be further configured to receive signals from and/or transmit control signals to one or more other devices associated with property 104, including, for instance, sensors 112 such as smoke detectors 114 and/or audio sensors 116. Controller 110 may be further configured to receive signals from and/or transmit control signals to one or more other remote devices, such as user computing devices 105, remote servers such as a signal hub 202 and/or an insurance server 204, and/or emergency service beacon 206 (shown and described with respect to FIG. 2).

In the exemplary embodiment, smoke detectors 114 may operate to detect the presence of smoke in a room 108 of property 104. For example, smoke detectors 114 may include photoelectric smoke detectors, which detect smoke when smoke particles scatter light within the detector to trigger a photo detector. Smoke detectors 114 may additionally or alternatively include ionization smoke detectors, which detect smoke when smoke particles disrupt an ionized radiation current within the detector. Upon detection of smoke, smoke detector 114 (e.g., a smoke detector 114A) is triggered or activated to generate an audible alarm (e.g., an audible alarm 115), also referred to as an "alert," in order to alert homeowner 106 of property 104 (and/or any person present at property 104) to the presence of smoke. In some embodiments, a plurality of smoke detectors 114 within a property 104 may be hard-wired to one another, such that activation of one smoke detector 114 automatically triggers the rest of the smoke detectors 114 to activate. For instance, the activated smoke detector 114 may transmit a control signal to the rest of the smoke detectors 114 that causes the rest of the smoke detectors 114 to activate and also emit an alarm. In other embodiments, one or more of smoke detectors 114 may operate independently of the others.

Moreover, in some embodiments, one or more smoke detectors 114 within property 104 may include a "smart" smoke detector 114. A smart smoke detector 114 may be configured to generate a signal when the smart smoke detector 114 is activated (e.g., when the smart smoke detector 114 has detected the presence of smoke). The signal may include an indicator that the smart smoke detector 114 has been activated. The smart smoke detector 114 may transmit the signal as to one or more other smoke detectors 114 (e.g., as a control signal to activate the other smoke detectors). Additionally or alternatively, the smart smoke detector 114 may transmit the signal as an alert to another device, such as controller 110, a user computing device 105, and/or a remote computing device (e.g., a remote server such as insurance server 204).

In some embodiments, audio sensors 116 of control system 102 are configured to detect an alarm generated by one or more of smoke detectors 114 (e.g., audible alarm 115). Audio sensors 116 may include any suitable sound- or audio-detection component(s), such as, but not limited to, microphones, electrostatic sensor(s), piezoelectric sensor(s), high-frequency sensor(s), low-frequency sensor(s), and/or any other such components. When an audio sensor 116 detects an alarm generated by one or more of smoke detectors 114, that audio sensor 116 is configured to transmit a signal (e.g., an alert) to controller 110 indicating detection of the smoke detector alarm (e.g., alarm 115). Additionally or alternatively, controller 110 itself may include one or more audio sensors 116 to directly detect alerts (e.g., audible alarms 115) generated by smoke detectors 114. It should be understood that in some embodiments in which smoke detectors 114 include smart smoke detectors 114 configured to transmit signals independently, audio sensors 116 may be omitted from control system 102.

In the exemplary embodiment, sensors 112 (e.g., smoke detectors 114 and/or audio sensors 116) may be in wired communication with controller 110. In other embodiments, some sensors 112 may be in wireless communication with controller 110 (e.g., via an IEEE 802.11 wireless local area network). Sensors 112 may collect, store, and/or transmit sensor data, or smart home telematics data. Sensor data may be stored local to sensor 112 and transferred, or collected from sensor 112 and transferred to controller 110 for storage and/or analysis. Further, in the example embodiment, some sensors 112 may be locally powered (e.g., battery, direct-attached solar array), other sensors 112 may be powered via connection to a power distribution network (e.g., 120-Volt Alternating Current network of property 104), and still other sensors 112 may not require power or are otherwise self-powered.

In some embodiments, sensors 112 may include other sensors, such as smart sensors, configured to collect smart home telematics data that includes indicators of smoke, fire, ash, and/or soot within and/or around property 104. For instance, sensors 112 may include video and/or audio sensors 112 that capture photos, video, and or audio signals that indicate a presence of smoke, fire, ash, and/or soot (e.g., a video of smoke or the sound of fire crackling). Smart home telematics data collected by sensors 112 within and/or exterior to property 104 may also be utilized to supplement received alerts. For instance, sensors 112 may include wind sensors configured to collect wind speed and/or direction data. Such wind data may be analyzed by controller 110 to determine whether a wildfire (or other fire exterior to property 104, such as a house fire in a nearby building) is moving towards (or otherwise threatening) property 104.

Moreover, sensors 112 may include sensors 112 disposed or mounted at locations exterior to HVAC system 120, specifically exterior to ductwork 126. Sensors 112 may additionally include sensors 112 disposed to mounted at locations interior to HVAC system 120, such as within ductwork 126. Sensors 112, as described herein, may generate alerts (e.g., audible alarm 115, a wireless alert signal, etc.) based upon presence or potential presence of smoke/fire/soot/ash within and/or near property 104. Controller 110 may subsequently receive those generated alerts and deactivate an air circulation function of HVAC system 120, as described herein. It may be beneficial for control system 102 to include one or more of sensors 112 outside of ductwork 126. In at least some cases, by the time smoke, ash, or soot reaches ductwork 126, at least some of the smoke, ash, or soot may have already been circulated by HVAC system 120 throughout property 104. By having one or more sensors 112 generating alerts from locations exterior to HVAC system 120, controller 110 may receive alerts sooner, facilitating improved smoke damage mitigation.

As used herein, a "smoke" event (also referred to as a "soot event" and/or a "smoke/soot event") refers generally to any event producing smoke, ash, and/or soot that may be damaging to property 104, particular an interior of property 104. Certain smoke events may be interior smoke events, such as smoke events caused by smoke inside of property 104 (e.g., burning food, a dryer fire, burning incense, smoking cigarettes, etc.). Other smoke events may be exterior smoke events, such as wildfires, property fires occurring at properties other than property 104, and/or other events exterior to property 104 that may generate smoke.

In the exemplary embodiment, controller 110 may be configured to receive an alert generated based upon a presence or a potential presence of at least one of smoke, fire, ash, and soot at a location associated with property 104. In response to receiving the alert, controller 110 may be configured to deactivate an air circulation function of HVAC system 120. In so doing, smoke damage to property 104 may be mitigated.

In one implementation of the exemplary embodiment, controller 110 may be configured to receive an alert generated based upon a potential presence of smoke within property 104 (e.g., a smoke event within property 104 may be occurring and/or may have occurred). The alert may include a signal generated by one or more smoke detectors 114 within property 104 in response to the detection of smoke within property 104. The alert may include at least one of (i) an audible alarm 115 generated by a smart smoke detector 114 in response to detection of smoke within property 104; (ii) a wireless alert signal generated by a smart smoke detector 114 upon activation of that smoke detector 114, transmitted by that smoke detector 114 (and/or another smoke detector 114 communicatively coupled thereto) to controller 110; and (iii) an alert generated by an audio sensor 116 upon detection of an alarm 115 generated by a smoke detector 114 transmitted by that audio sensor (and/or another audio sensor 116 communicatively coupled thereto) to controller 110 and/or received at controller 110 (in embodiments in which controller 110 includes an audio sensor 116 therein).

In some embodiments, controller 110 may be configured to deactivate the air circulation function of HVAC system 120 in response to a control signal independent of a received alert. For instance, in such embodiments, controller 110 may receive a control signal generated by a remote computing device (e.g., user computing device 105 or insurance server 204), the control signal causing controller 110 to deactivate the air circulation function of HVAC system 120. Controller 110 may monitor or listen for such control signals. In some embodiments, the control signal may be generated at the remote computing device in response to social media, a manual or in-person evacuation order (e.g., delivered to a user of user computing device 105, such as homeowner 106). Moreover, controller 110 may receive control signal(s) from additional or alternative sources, such as a satellite or other still imaging and/or video imaging device (e.g., a drone) that captures images and/or videos of fire, smoke plumes, fire/wind directions and identifies a smoke/fire event. The satellite or other still imaging and/or video imaging device may additionally or alternatively generate an alert that is transmitted to controller 110, causing controller 110 to deactivate the air circulation function of HVAC system 120.

In some embodiments, controller 110 may receive the alert including and/or as part of smart home telematics data collected by one or more sensors 112 throughout and/or exterior to property 104. Controller 110 may analyze the smart home telematics data received to identify any indicator of presence of at least one of smoke, fire, ash, and soot in a location associated with property 104.

Controller 110 may be configured to deactivate the air circulation function of HVAC system 120 by deactivating one or more components of HVAC system 120. In one embodiment, controller 110 may deactivate blower component 130 of furnace unit 124 and/or air conditioning unit 122. In such an embodiment, circulation of air throughout ductwork 126 may be substantially inhibited because no component is functioning to force air through ductwork 126. In another embodiment, controller 110 may deactivate heat exchanger 125 of air conditioning unit 122 and/or of furnace unit 124. In such an embodiment, smoky, ashy, and/or sooty air from environment 128 exterior to property 104 may not be drawn into HVAC system 120 and/or into property 104. In some such embodiments, controller 110 may not deactivate furnace unit 124 and/or air conditioning unit 122, such that furnace unit 124 and/or air conditioning unit 122 would not need to be restarted (manually or automatically). In another embodiment, controller 110 may deactivate furnace unit 124 and/or air conditioning unit 122. Controller 110 may be configured to determine which of furnace unit 124 and air-conditioning unit 122 is active (i.e., functioning to heat, condition, or cool air) and only deactivate the one of furnace unit 124 and air conditioning unit 122 that is active. Alternatively, controller 110 may be configured to deactivate both of furnace unit 124 and air-conditioning unit 122. Controller 110 may deactivate any component of HVAC system 120 communicatively coupled thereto (e.g., via wired and/or wireless connection) by transmitting a control signal that causes the receiving component(s) of HVAC system 120 to deactivate (e.g., by removing a power source thereto and/or changing a state from active or enabled to inactive or disabled).

Additionally or alternatively, controller 110 may be configured to deactivate the air circulation function of HVAC system 120 by activating one or more components of HVAC system 120. In one embodiment, controller 110 may activate one or more dampers 136 of HVAC system 120, within one or more ducts 129. Controller 110 may activate damper(s) 136 by transmitting a control signal to respective actuator(s) 138, the control signal causing the respective actuator(s) 138 to close damper(s) 136 and restrict and/or prevent airflow therepast. In some instances, ductwork 126 may include one "main" damper 136A in a preliminary or central location of ductwork 126, such that activating the main damper 136A would restrict and/or prevent air circulation throughout the remainder of ductwork 126 (e.g., throughout substantially all of ducts 129). In other embodiments, controller 110 may activate one or more vents 132 of HVAC system 120. Controller 110 may activate vent(s) 132 by transmitting a control signal to respective actuator(s) 134, the control signal causing the respective actuator(s) 134 to close vent(s) 132 and restrict and/or prevent airflow therepast.

In some embodiments, positions of individual sensors 112 (e.g., smoke detectors 114, and/or audio sensors 116) within property 104 are known, and an alert generated by a particular sensor 112 may be distinguished from an alert generated by other sensors 112. As such, controller 110 may receive an alert generated by a sensor 112 and determine a location within property 104 (e.g., one or more rooms 108) associated with and/or nearby to that sensor 112. Controller 110 may be configured to activate only those vents 132 and/or dampers 136 associated with the location of the sensor 112 from which the alert was received, preventing circulation of air from that location into the rest of property 104.

Controller 110 may additionally or alternatively be configured to automatically deactivate one or more other components of property 104 that may circulate and/or provide access for smoky/sooty/ashy air to enter property 104, such as an exhaust fan (e.g., a whole-house exhaust, bathroom exhaust, stove hood exhaust) or clothes dryer with an exterior vent. In some embodiments, these other components of property 104 are IoT components such that controller 110 may access and/or control these components. In such embodiments, controller 110 may transmit control signals to these other components of property 104, for example, using wired or wireless data transmission or radio communication.

In implementations in which the received alert includes and/or is associated with alarm 115 (and/or another alert generated by smoke detector(s) 114), controller 110 may be configured to reactivate the air circulation function of HVAC system 120 after a predefined amount of time has passed since an end of the alert. In other words, if alarm 115 stopped 30 minutes ago, controller 110 may reactivate the air circulation function of HVAC system 120. The predefined amount of time may be defined by homeowner 106 and/or may be pre-set (e.g., a factory setting of controller 110). In implementations in which smart home telematics data was analyzed to identify one or more indicator(s) of the presence of smoke, fire, ash, and/or soot at a location associated with property 104, controller 110 may be configured to analyze additional smart home telematics data (e.g., smart home telematics data received at a later period in time) to identify any indicators of a subsequent absence of the smoke, fire, ash, and/or soot. Controller 110 may subsequently reactivate the air circulation function of HVAC system 120 if controller 110 determines that the smoke, fire, ash, and/or soot is no longer threatening property 104.

In the exemplary embodiment, controller 110 may reactivate the air circulation function of HVAC system 120 by reversing any steps taken to deactivate the air circulation function of HVAC system 120. For example, if controller 110 transmitted a control signal to blower component 130 of furnace unit 124 to deactivate blower component 130, controller 110 may transmit another control signal to blower component 130 to reactivate blower component 130. In some instances in which a component of HVAC system 120 has been deactivated (e.g., by cutting off power to the component), manual restarting, resetting, or reconnecting of that component may be required.

Figure 2:
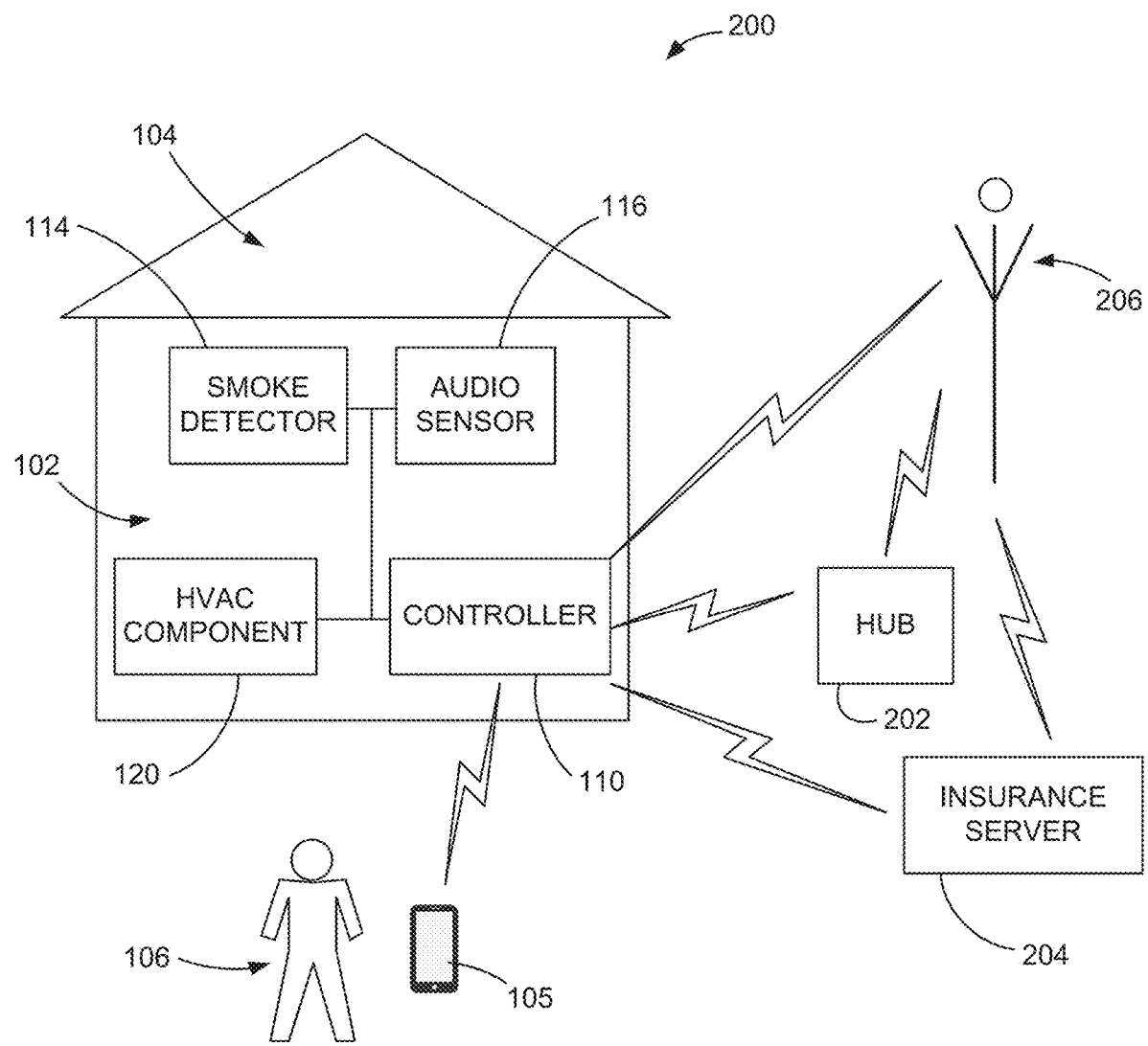
FIG. 2 depicts an exemplary schematic diagram of the control system shown in FIG. 1.

FIG. 2 depicts an exemplary environment 200 including building environment 100 shown in FIG. 1, illustrating another implementation of the exemplary control system 102. In the exemplary embodiment, controller 110 of control system 102 may be further in communication (via a wired and/or wireless connection) with one or more remote devices (such as via wireless communication or data transmission over one or more radio frequency links or digital communication channels). In particular, controller 110 may be in communication with a signal hub 202, an insurance server 204, and/or an emergency service beacon 206.

Emergency service beacon 206 may include any source of emergency alert information. For instance, emergency service beacon 206 may include a component of the NWS's Specific Area Message Encoding (SAME) system, a component of an independent weather service emergency broadcast system, a beacon associated with a local emergency and/or dispatch service, and/or a beacon component of any other emergency alert/notification system. Emergency service beacon 206 may include a radio antenna in some embodiments, and additionally or alternatively may include any other type of transmitter, transceiver, and/or receiver capable of wirelessly (and/or over a wired connection) transmitting emergency alert signals or messages.

In the exemplary embodiment, emergency service beacon 206 is a component of the SAME system and is configured to transmit SAME alert messages including alert data to receivers within a predefined area around emergency service beacon 206. In alternative embodiments, emergency service beacon 206 may be any other component capable of transmitting alert data in any format.

Figure 3:
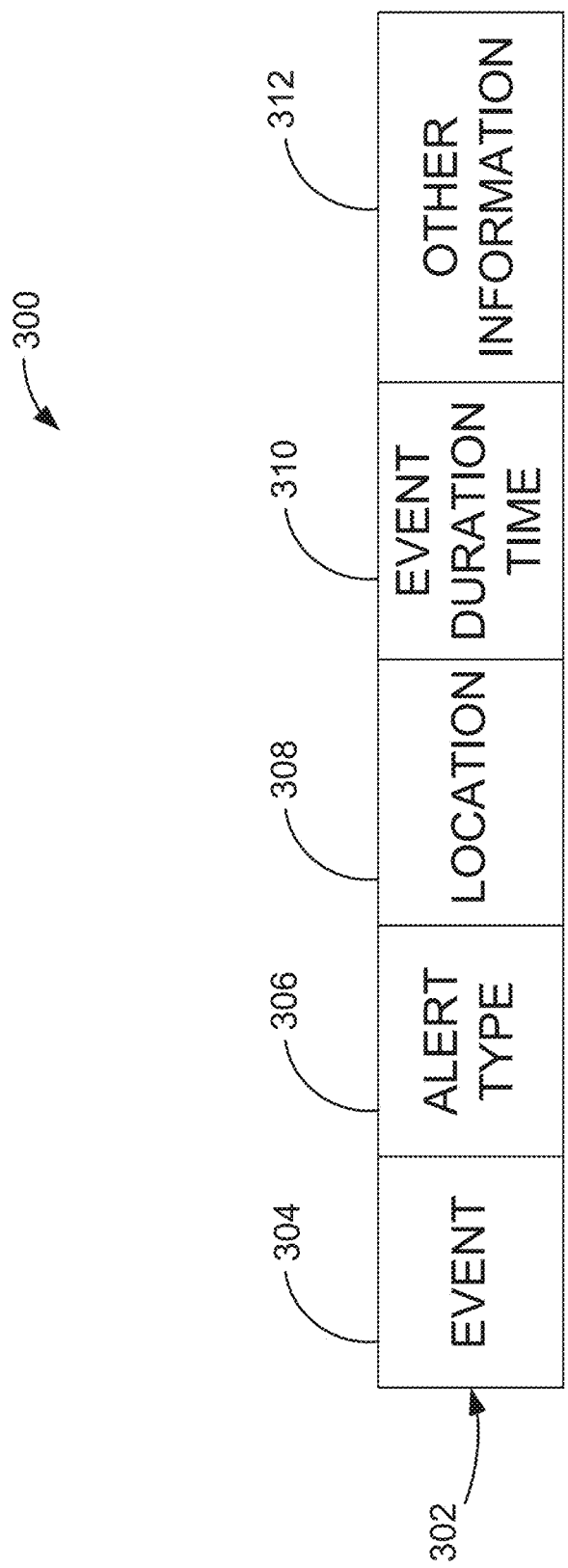
FIG. 3 depicts a schematic illustration of exemplary weather data that may be used by the control system shown in FIG. 1.

With reference to FIG. 3, exemplary alert data 300 is illustrated. Alert data 300 may include a plurality of data elements 302. Data elements 302 may be formatted in any suitable format capable of being transmitted by emergency service beacon 206 and received by suitable receivers within the predefined area around emergency service beacon 206. Data elements 302 may include, for example, include information concerning a threatening weather event 304 (e.g., a wildfire), a type of alert 306 (e.g., an advisory, watch or warning), a location 308 associated with weather event 304, an event duration time 310, and other information 312. Location 308 may include one or more global positioning system coordinates indicating an area for threatening weather event 304. Alert data 300 may additionally or alternatively include any other data elements 302. For instance, in one embodiment, data elements 302 include data associated with a non-weather emergency event (e.g., a house fire).

Returning to FIG. 2, in the exemplary embodiment, controller 110 may include any suitable transceiver or receiver configured to receive alert data (e.g., alert data 300) from emergency service beacon 206. For example, in one embodiment, controller 110 may include a radio antenna and receiver and may continuously monitor for alerts that are locally broadcast by emergency service beacon 206 (e.g., NWS's SAME system) in the same area as controller 110 and/or property 104. Additionally or alternatively, controller 110 may include pre-set or user-configured location data or a GPS receiver to indicate a location of property 104 and/or controller 110. Thus, a controller 110 tuned to a local NWS frequency may receive alert data that is relevant for the location of that property 104 and/or that controller 110. Similarly, a controller 110 having a location indication (e.g., pre-set, user-configured, or GPS location data) may determine whether received alert data includes location data indicating that the alert is relevant to the current location of controller 110.

In such implementations of the exemplary embodiment, the alert that triggers controller 110 may include the received alert data generated by emergency service beacon 206. As described further herein, the alert may additionally or alternatively include alert data generated by an alternative source (e.g., signal hub 202) and/or a control signal generated by another source (e.g., signal hub 202, insurance server 204, and/or user computing device 105). The received alert, when associated with received alert data, indicates an exterior smoke event, or the potential presence of smoke at a location exterior to but associated with property 104. For instance, smoke may be present within a certain number of miles of property 104, in the case of a wildfire alert, or substantially adjacent property 104, in the case of a house fire alert sent by an emergency dispatch service.

Once an alert for the location of controller 110 is received, the type and content may be identified (e.g., based upon received data element 302 of alert data 300). In some embodiments, if the alert is an advisory, controller 110 may communicate the alert and/or portions of the alert data to homeowner 106, as described further herein. If the alert is a watch or a warning, then controller 110 may communicate the alert to homeowner 106 and may also automatically deactivate an air circulation function of HVAC system 120, as described herein.

Controller 110 may be further configured to leverage smart home telematics data with received alert data to determine whether a smoke event such as a wildfire or house fire may be threatening to property 104. For instance, controller 110 may analyze smart home telematics data, such as wind speed and/or wind direction data, to determine whether a wildfire or house fire is moving towards and/or having smoke/soot/ash blown towards property 104.

Controller 110 may be further configured to use received alert data to determine an estimated duration of the exterior smoke event (e.g., using event duration time 310). In such embodiments, when the exterior smoke event is determined to be over, controller 110 may reactivate the air circulation function of HVAC system 120, as described herein. In some embodiments, controller 110 may transmit a "reactivation confirmation request" message to homeowner 106 (e.g., to user computing device 105) before reactivating the air circulation function of HVAC system 120. The reactivation confirmation request includes a request to homeowner 106 to confirm or approve the reactivation of the air circulation function. In these embodiments, homeowner 106 may approve the request, if homeowner 106 is confident the smoke event is over, or may reject the request, if homeowner 106 does not believe the smoke event is over or that air circulation should be reactivated. Alternatively, controller 110 may wait to reactivate air circulation function until a control signal is received (e.g., from user computing device 105) that causes controller 110 to reactivate the air circulation function.

Signal hub 202 may include a computing device configured to continuously listen or monitor for and/or receive alert data from emergency service beacon 206 and to transmit relevant alert data to controller 110. "Relevant" alert data may include any alert data associated with a location including property 104. Accordingly, signal hub 202 may filter alert data received from one or more emergency service beacon 206 and only transmit relevant alert data to controller

110. Additionally or alternatively, signal hub 202 may be configured to reformat received alert data into a format receivable and/or processable by controller 110. For instance, signal hub 202 may include a radio antenna and/or other radio receiver configured to receive radio weather alerts and associated alert data from emergency service beacon 206. Signal hub 202 may further include any suitable computing components to reformat the radio-based alert into a text-based alert (e.g., a text message or email message) receivable by controller 110.

In the exemplary embodiment, insurance server 204 includes one or more computing devices and/or computing systems associated with and/or operated by an insurance entity that maintains one or more insurance policies associated with property 104 (e.g., homeowner's insurance, flood insurance, renter's insurance, personal property insurance, etc.). Accordingly, insurance server 204 may collect and maintain data records associated with property 104 and/or insurance policies associated therewith. For instance, insurance server 204 may maintain claim records, premium information, and/or any other information.

Insurance server 204 may be configured to receive alert data from emergency service beacon 206, signal hub 202, and/or controller 110. For instance, insurance server 204 may receive alert data associated with locations including a plurality of properties 104 that may be affected by a weather event from signal hub 202. Insurance server 204 may additionally or alternatively receive alert data associated with and/or relevant to one particular property 104 from controller 110 associated with that property 104. In some embodiments, insurance server 204 may receive alert data directly from one or more emergency service beacons 206 within range of insurance server 204.

In some embodiments, insurance server 204 may be configured to transmit one or more control signals to controller 110 based upon received alert data. Insurance server 204 may transmit control signals causing controller 110 to deactivate and/or activate air circulation functions of HVAC system 120 of property 104. Insurance server 204 may additionally or alternatively transmit request signals causing controller 110 to confirm whether controller 110 has performed smoke mitigation process(es) in response to alert data.

In the exemplary embodiment, user computing device 105 of homeowner 106 may also be configured to receive alert data, from controller 110, signal hub 202, insurance server 204, and/or emergency service beacon 206. In some embodiments, homeowner 106 may receive alert data and/or may be notified of an alert based upon preference settings selected by homeowner 106. For example, homeowner 106 may choose to be notified via user computing device 105. In other embodiments, homeowner 106 may choose to be notified via visual indicators (e.g., LED lights) on a control panel of controller 110 and/or an HVAC control panel, such as thermostat 123.

In some embodiments, homeowner 106 may have a user preference that a request for user response be included in certain notifications sent. For example, an email message or a text message may be sent to user computing device 105 indicating that a wildfire watch alert was received. Upon viewing the email or text message, homeowner 106 may respond with an instruction to override the subsequent automatic mitigation steps by sending a control signal (e.g., within a further email or text message) to controller 110. However, if no user response is detected within a specified time period, or if homeowner 106 has configured controller 110 to automatically initiate a smoke damage mitigation process upon receipt of such an alert, then controller 110 may proceed to automatically initiate the smoke mitigation process (i.e., deactivate the air circulation function of HVAC system 120).

It should be understood that although particular alerts are described herein, such as smoke detector alarms and emergency alerts, additional and/or alternative alerts to trigger controller 110 to deactivate the air circulation function of HVAC system 120 may be contemplated. For instance, a user may utilize a user computing device (e.g., user computing device 105, shown in FIG. 1) to manually generate and transmit control signals to trigger controller 110. The control signals may be formatted to cause controller 110 to perform the smoke damage mitigation steps described herein. Such functionality may be useful for homeowners remote from a property such as a vacation home.

The homeowner and/or a third party, such as a property management company or an insurance provider maintaining a policy associated with the property, may send the alert if an evacuation order has been issued for the location of the property or if other adverse conditions exist. Moreover, it should be understood that although reference is made herein to a "homeowner," any such reference may be equally applicable to any user, such as a family member of a homeowner, a renter, and/or a third party.

Exemplary Controller

Figure 4:
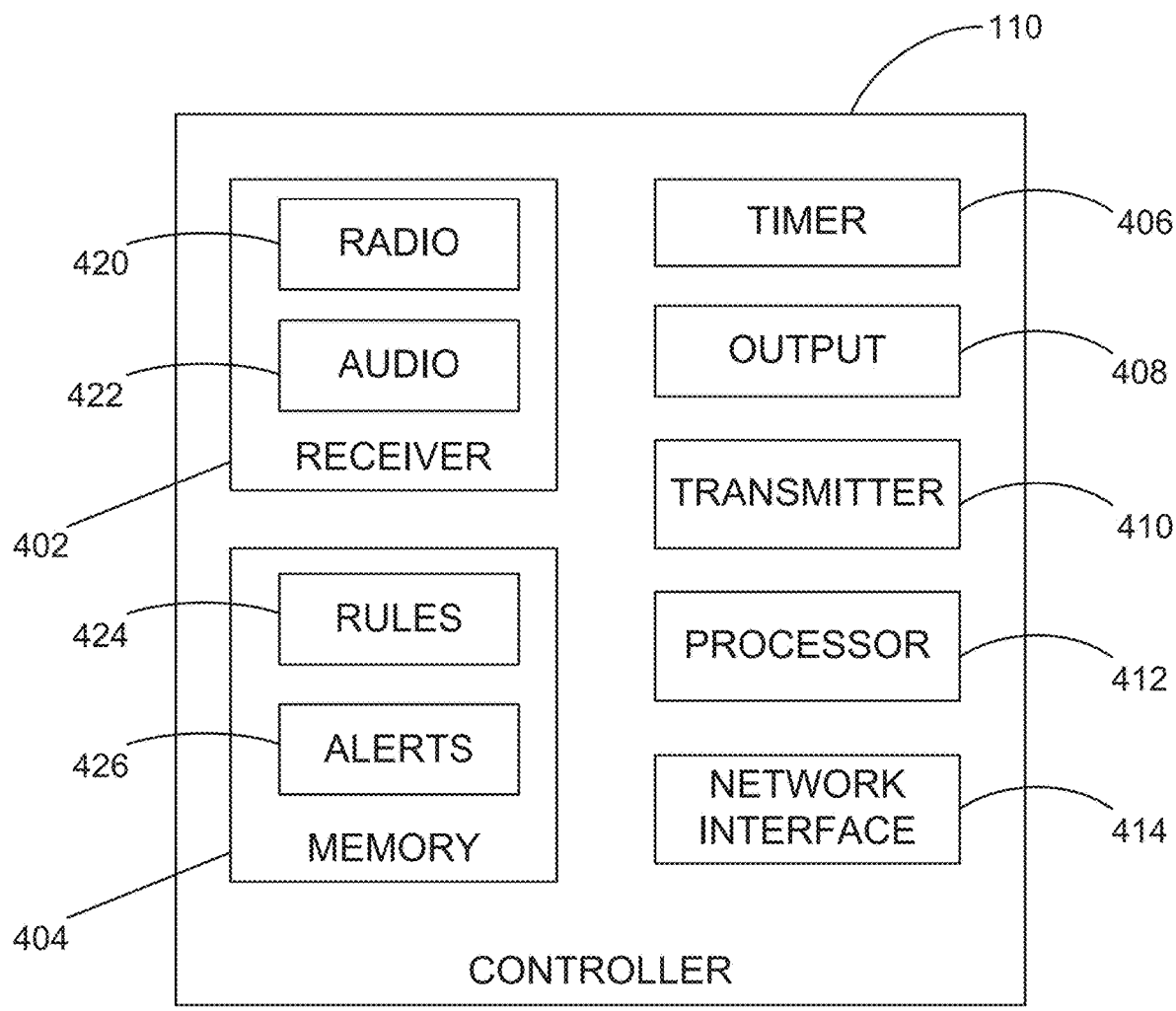
FIG. 4 depicts a schematic diagram of an exemplary controller that may be used in the control system shown in FIG. 1.

FIG. 4 depicts one exemplary embodiment of controller 110 for use in control system 102 (both shown in FIG. 1). Controller 110 may include a plurality of components, such as, but not limited to, a receiver 402, a memory 404, a timer 406, an output device 408, a transmitter 410, a processor 412, and/or a network interface 414. It should be understood that certain components illustrated as separate may, in alternative embodiments, be implemented within the same component.

Receiver 402 may be configured to receive one or more formats or types of incoming signals. For instance, receiver 402 may include a radio receiving unit 420 (e.g., an antenna) configured to receive radio signals (e.g., emergency alert data) and/or an audio receiving unit 422 configured to receive audio signals (e.g., smoke detector alarms 115, shown in FIG. 1). Receiver 402 may include additional, fewer, and/or alternative units.

Memory 404 may include any suitable type of memory configured to store data. In some embodiments, memory 404 stores rules 424 and alerts 426. Rules 424 may include rules directed to when controller 110 should activate and/or deactivate various components of HVAC system 120, how to perform such activation and/or reactivation, how to interpret incoming alerts, and/or user preferences. Controller 110 may store alerts 426 in memory 404 to track received alerts (which may include any kind of received alert and/or a record thereof).

Timer 406 may be configured to implement one or more stored rules 424 regarding when controller 110 may reactivate the air circulation function of HVAC system 120. For instance, where a stored rule 424 indicates that controller 110 should reactivate air circulation function of HVAC system 120 once 30 minutes have elapsed after the end of a smoke detector alarm, timer 406 may be configured to initiate the 30 minutes after the end of the smoke detector alarm.

Output device 408 may include any suitable output device capable of making information accessible to a user (e.g., homeowner 106). Output device 408 may include one or more visual indicators, such as LED lights, a screen, and/or a touch screen. Controller 110 may make information available to user via output device 408, such as any received alerts, the status of HVAC system 120 and/or any components thereof, and/or any other information.

Transmitter 410 may include any hardware and/or software components suitable to transmit information from controller 110 to another computing device, such as user computing device 105, insurance server 204, and/or components of HVAC system 120. Controller 110 may use transmitter 410 to transmit control signals, status updates, alerts, alert data, notifications, and/or any other information.

Processor 412 may include any processing hardware and/or software such that controller 110 may function as described herein. Processor 412 may be used to implement one or more processes described herein, such as receiving alerts/alert data, processing alerts/alert data, receiving control signals, generating control signals, and/or any other processes of controller 110.

Network interface 414 may include any network interface hardware such that controller 110 is accessible and/or can access one or more networks, such as a Wi-Fi network within property 104, near-field networks such as Bluetooth®, Local or Wide-Area Networks, and/or any other network. Network interface 414 may facilitate communication between controller 110 and one or more other devices, such as sensors 112, components of HVAC system 120, user computing device 105, and/or insurance server 204.

Exemplary Method of Monitoring Building Health

Figure 5:
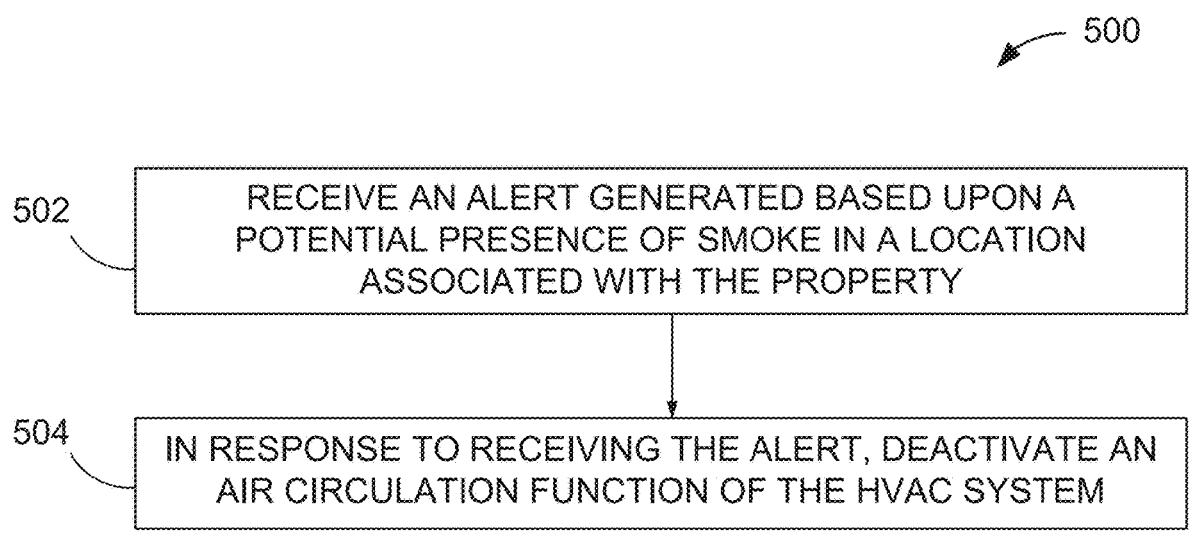
FIG. 5 illustrates a flowchart of an exemplary computer-implemented method for controlling an HVAC system to mitigate smoke damage to a property.

FIG. 5 depicts a flow chart of an exemplary computer-implemented method 500 controlling an HVAC system (such as HVAC system 120) to mitigate smoke damage to a property (such as property 104, both shown in FIG. 1). In the exemplary embodiment, method 500 may be performed by one or more computing systems, such as control system 102 (also shown in FIG. 1).

Method 500 may include a plurality of steps. In the exemplary embodiment, method 500 may include receiving 502 an alert generated based upon a potential presence of smoke in a location associated with the property. Method 500 may also include deactivating 504, in response to receiving the alert, an air circulation function of the HVAC system.

In some embodiments, receiving 502 an alert may include receiving 502 an alert generated by at least one of: (i) a device exterior to the property, and (ii) a device within the property and exterior to the HVAC system. In some cases, the HVAC system may include ductwork, and the device within the property and exterior to the HVAC system may be exterior to the ductwork of the HVAC system. In other embodiments, receiving 502 an alert may include receiving 502 an alert generated by at least one of: (i) a device exterior to the property, (ii) a device within the property and exterior to the HVAC system, and (iii) a device within the property and within the HVAC system.

In some embodiments, receiving 502 an alert may include receiving 502 the alert including an emergency alert from an emergency service. Additionally, receiving 502 may further include receiving 502 a National Weather Service wildfire alert identifying a wildfire in the location associated with the property, the location associated with the property including a location exterior to the property. In such embodiments, wherein the National Weather Service wildfire alert includes an affected area, method 500 may further include determining that the affected area includes the property. Additionally or alternatively, the National Weather Service wildfire alert includes an alert time period, and method 500 further includes determining an end of the alert time period, and/or reactivating the air circulation function of the HVAC system at the end of the alert time period. In some embodiments, method 500 may further include (i) receiving smart home telematics data from one or more sensors associated with the property, (ii) analyzing the National Weather Service wildfire alert and the smart home telematics data to determine whether the wildfire is moving toward the property, and/or (iii) when the wildfire is moving toward the property, deactivate the air circulation function of the HVAC system.

In some embodiments, receiving 502 may include receiving 502 the emergency alert from a signal hub. In other embodiments, receiving 502 may include receiving a fire alert from an emergency dispatch service, the location associated with the property including a location exterior to the property. In still other embodiments, receiving 502 may include receiving 502 the alert including an audio signal generated by a smoke detector within the property, the location associated with the property including an interior of the property. In such embodiments, the audio signal may have a beginning and an end, and method 500 may further include determining that a threshold amount of time has passed since the end of the audio signal, and/or reactivating the air circulation function of the HVAC system. In other embodiments, receiving 502 may include receiving 502 a wireless alert signal generated by a smoke detector within the property, the location associated with the property including an interior of the property.

In still other embodiments, deactivating 504 may include deactivating 504 at least one component of the HVAC system. In some cases, deactivating 504 at least one component of the HVAC system may include transmitting a deactivation control signal to the at least one component. In other cases, deactivating 504 at least one component of the HVAC system may include blocking transmission of power to the at least one component. In some instances, deactivating 504 at least one component of the HVAC system may include deactivating a blower component of the HVAC system and/or deactivating a heat exchanger of the HVAC system. Moreover, in some embodiments, deactivating 504 may include activating one or more dampers within ductwork of the HVAC system.

Method 500 may include additional, alternative, and/or fewer steps. For instance, method 500 may include (i) receiving a first wireless control signal from a remote computing device, and/or (ii) in response to receiving the first wireless control signal, deactivating the air circulation function of the HVAC system. In such embodiments, method 500 may further include (i) receiving a second wireless control signal from the remote computing device, the second wireless control signal indicating an absence of smoke in the location associated with the property, and/or (ii) in response to receiving the second wireless control signal, reactivating the air circulation function of the HVAC system.

Method 500 may include, in some embodiments, (i) analyzing smart home telematics data received to identify any indicator of presence of at least one of smoke, fire, ash, and soot in the location associated with the property, and/or (ii) in response to identifying any indicator of the presence of the at least one of smoke, fire, ash, and soot, deactivate the air circulation function of the HVAC system. Method 500 may also include (iii) analyzing the smart home telematics data received to identify any indicator of absence of the at least one of smoke, fire, ash, and soot in the location associated with the property, and/or (iv) in response to identifying any indicator of the absence of the at least one of smoke, fire, ash, and soot, reactivate the air circulation function of the HVAC system.

Exemplary Computing Devices

Figure 6:
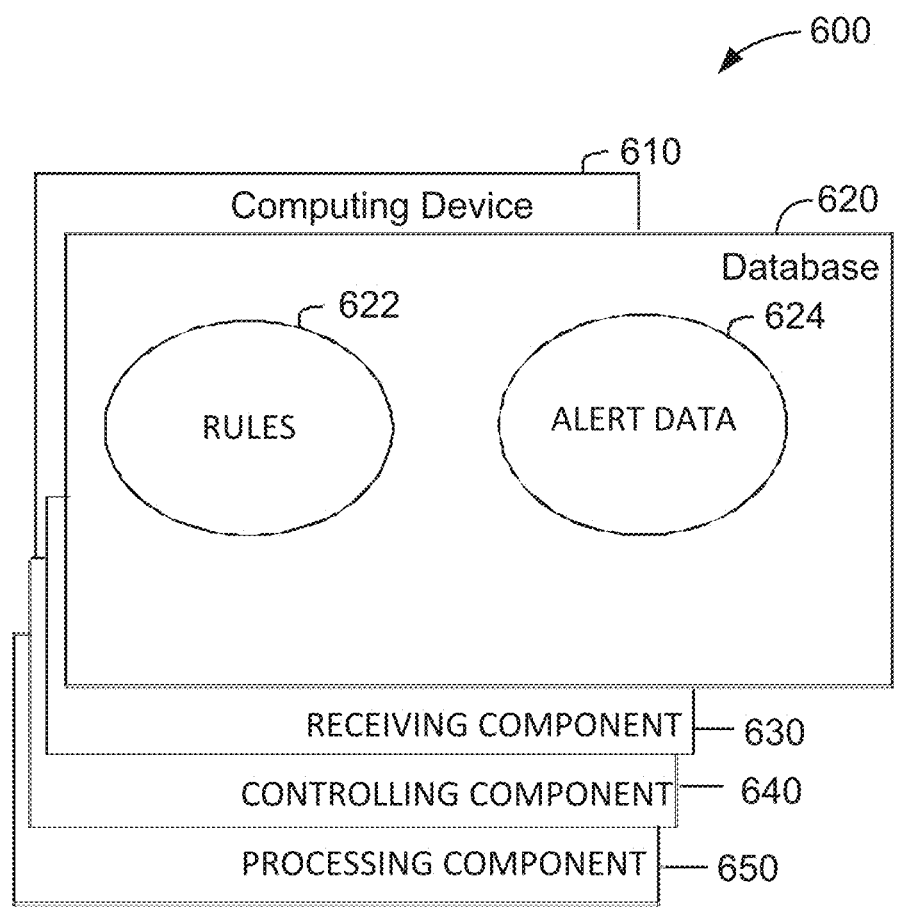
FIG. 6 depicts a diagram of components of one or more exemplary computing device that may be used in the control system shown in FIG. 1.

FIG. 6 depicts an exemplary configuration 600 of a database 620 within a computing device 610, along with other related computing components, that may be used for receiving an alert generated based upon a potential presence of smoke in a location associated with a property, and in response to receiving the alert, deactivate an air circulation function of the HVAC system. Database 620 may be coupled to several separate components within computing device 610, which perform specific tasks. In the exemplary embodiment, computing device 610 may be a computing component of control system 102, such as controller 110 (both shown in FIG. 1).

In the exemplary embodiment, database 620 may include rules 622 that direct operation of computing device 610 (which may be similar to rules 424) and alert data 624 received from other devices (e.g., an emergency service beacon 206, shown in FIG. 2). Database 620 may include additional, less, and/or alternative information without departing from the scope of the disclosure.

Computing device 610 may include the database 620, as well as a plurality of other components including a receiving component 630, a control component 640, and a processing component 650. Receiving component 630 may be configured to receive any kind of data, specifically alerts and/or control signals. Receiving component 630 may be integral to a receiver and/or transceiver (and/or capable of wireless communication or data transmission over one or more radio links or digital communication channels). Control component 640 may be configured to control one or more components of an HVAC system (e.g., HVAC system 120, shown in FIG. 1). For instance, control component 640 may be configured to deactivate an air circulation function of the HVAC system. Control component 640 may be further configured to subsequently reactivate the air circulation function of the HVAC system under conditions described by rules 622. Processing component 650 may assist with execution of computer-executable instructions associated with computing device 610.

Figure 7:
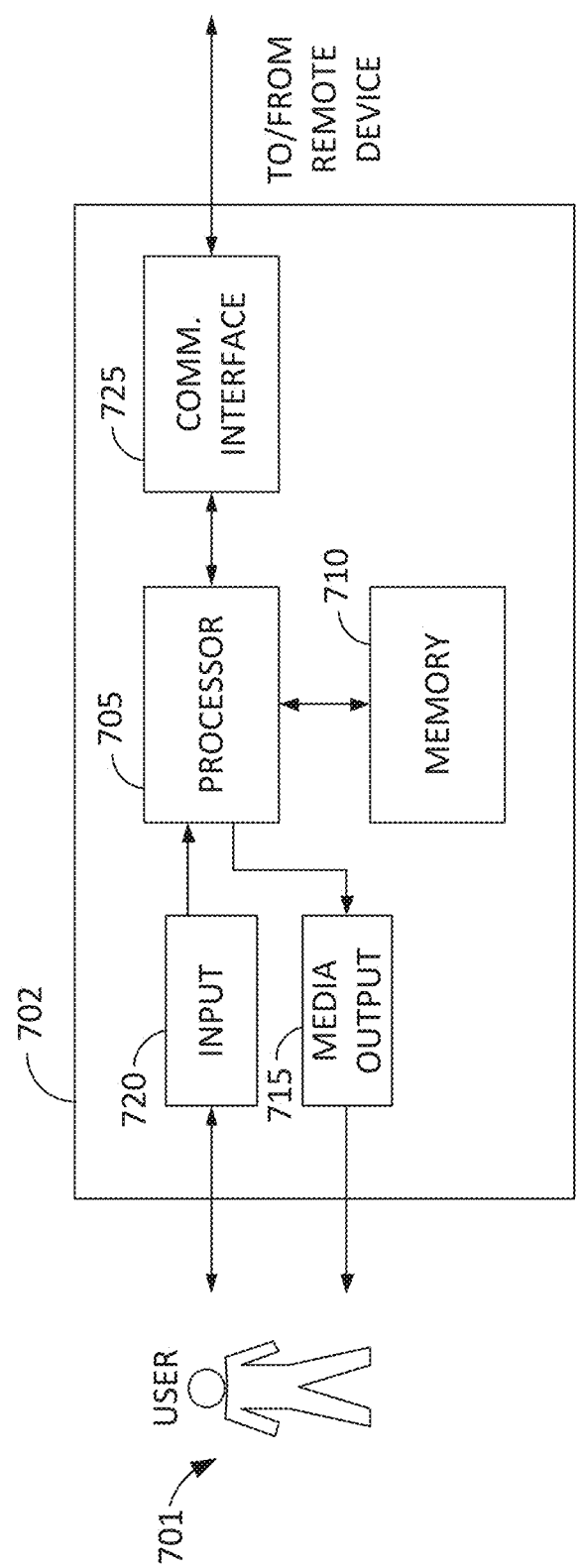
FIG. 7 illustrates an exemplary configuration of a user computing device that may be used with the control system shown in FIG. 1, in accordance with one embodiment of the present disclosure.

FIG. 7 illustrates an exemplary configuration of a user system 702 operated by a user 701, such as homeowner 106 (shown in FIG. 1). User system 702 may include, but is not limited to, user computing device 105, controller 110 (both shown in FIG. 1), and/or signal hub 202 (shown in FIG. 2). In the exemplary embodiment, user system 702 may include a processor 705 (which may be similar to processor 412 shown in FIG. 4) for executing instructions.

In some embodiments, executable instructions may be stored in a memory area 710. Processor 705 may include one or more processing units, for example, a multi-core configuration. Memory area 710 (which may be similar to memory 404 shown in FIG. 4) may be any device allowing information, such as executable instructions and/or written works to be stored and/or retrieved. Memory area 710 may include one or more computer readable media.

User system 702 may also include at least one media output component 715 for presenting information to user 701. Media output component 715 may be any component capable of conveying information to user 701. In some embodiments, media output component 715 may include an output adapter, such as a video adapter and/or an audio adapter. An output adapter may be operatively coupled to processor 705 and operatively couplable to an output device, such as a display device, a liquid crystal display (LCD), organic light emitting diode (OLED) display, or "electronic ink" display, or an audio output device, a speaker or headphones.

In some embodiments, user system 702 may include an input device 720 for receiving input from user 701. Input device 720 may include, for example, a keyboard, a pointing device, a mouse, a stylus, a touch sensitive panel, a touch pad, a touch screen, a gyroscope, an accelerometer, a position detector, and/or an audio input device. A single component, such as a touch screen, may function as both an output device of media output component 715 and input device 720.

User system 702 may also include a communication interface 725, which may be communicatively couplable to a remote device such as controller 110, signal hub 202, insurance server 204 (shown in FIG. 2), and/or any other device. Communication interface 725 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 710 are, for example, computer readable instructions for providing a user interface to user 701 via media output component 715 and, optionally, receiving and processing input from input device 720. A user interface may include, among other possibilities, a web browser and client application. Web browsers enable users, such as user 701, to display and interact with media and other information typically embedded on a web page or a website. A client application may allow user 701 to interact with a server application.

Figure 8:
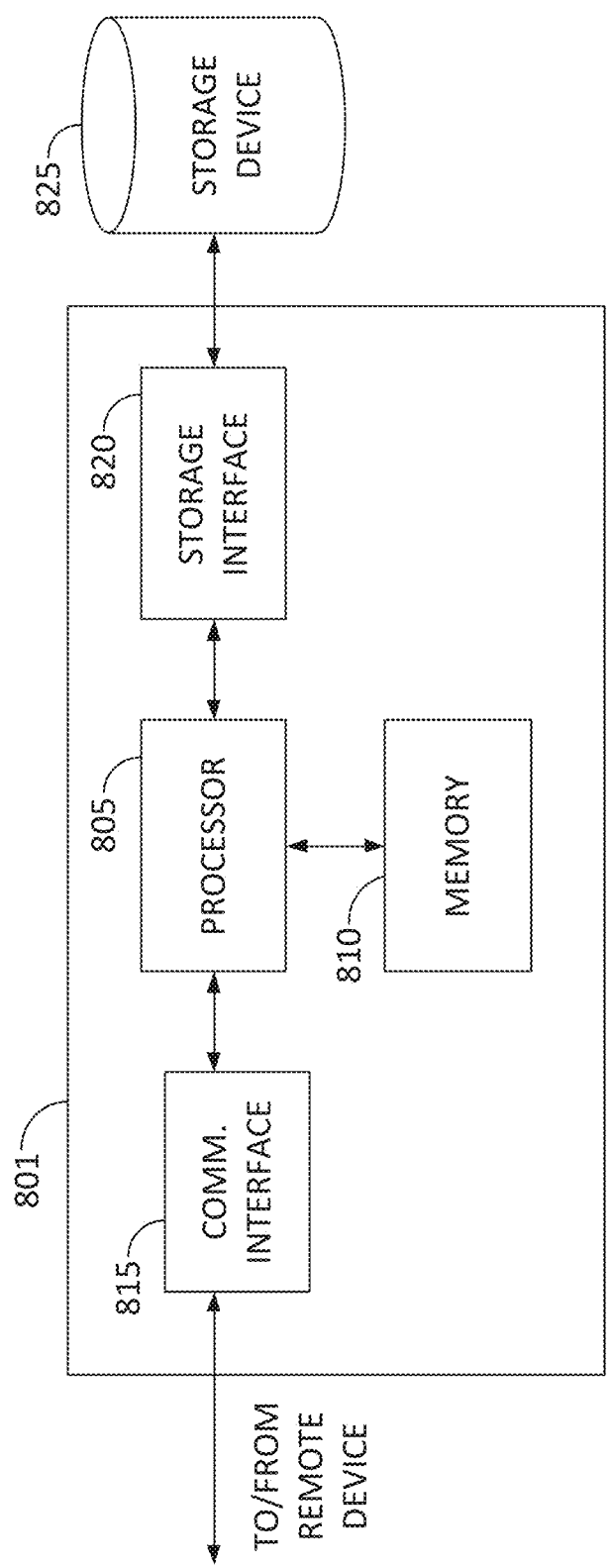
FIG. 8 illustrates an exemplary configuration of a server system that may be used with the control system shown in FIG. 1, in accordance with one embodiment of the present disclosure.

FIG. 8 illustrates an exemplary configuration of a server system 801, such as controller 110 (shown in FIG. 1), signal hub 202, and/or insurance server 204 (both shown in FIG. 2). Server system 801 may include a processor 805 for executing instructions. Instructions may be stored in a memory area 810, for example. Processor 805 may include one or more processing units (e.g., in a multi-core configuration) for executing instructions. The instructions may be executed within a variety of different operating systems on the server system 801, such as UNIX, LINUX, Microsoft Windows®, etc.

It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 805 may be operatively coupled to a communication interface 815 such that server system 801 is capable of communicating with a remote device, such as a user system or another server system 801. For example, communication interface 815 may receive requests from user system 702 (shown in FIG. 7).

Processor 805 may also be operatively coupled to a storage device 825. Storage device 825 may be any computer-operated hardware suitable for storing and/or retrieving data. In some embodiments, storage device 825 may be integrated in server system 801.

For example, server system 801 may include one or more hard disk drives as storage device 825. In other embodiments, storage device 825 is external to server system 801 and may be accessed by a plurality of server systems 801. For example, storage device 825 may include multiple storage units such as hard disks or solid state disks in a redundant array of inexpensive disks (RAID) configuration.

Storage device 825 may include a storage area network (SAN) and/or a network attached storage (NAS) system.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Memory areas 710 (shown in FIG. 7) and/or 810 may include, but are not limited to, random access memory (RAM), such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAM). The above memory types are exemplary only, and are thus not limiting as to the types of memory usable for storage of a computer program.

Exemplary Insurance-Related Functionality

It is contemplated that the systems and methods described herein may impact one or more aspects of an insurance policy associated with property 104 (shown in FIG. 1). In one embodiment, an insurance policy premium may be decreased or otherwise adjusted if property 104 includes control system 102, as control system 102 may prevent and/or reduce smoke damage to property 104, thereby reducing cleaning and/or replacement costs incurred after smoke damage. In other embodiments, discounts on one or more insurance policies for properties 104 that have control systems 102 may be offered. In the exemplary embodiment, insurance server 204 (shown in FIG. 2) may be configured to calculate any insurance premium adjustments and/or discounts.

Insurance server 204 may additionally or alternatively be configured to collect and store records of smoke events associated with one or more properties 104. Insurance 204 may monitor the frequency and/or severity of smoke events associated with properties 104, to adjust premiums and/or offer discounts to install control systems 102 at other properties 104 in areas associated with a high risk of smoke damage.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted interior or exterior to properties or mobile devices, or associated with smart infrastructure or remote servers, or satellites), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest.

Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as weather, emergency dispatch, NWS emergency alert, NOAA emergency alert, NOAA "Hazard Mapping System (HMS) Fire and Smoke Product" data or imagery, audible smoke alarm, and/or "smart home" telematics data. The machine learning programs may utilize deep learning algorithms that may be primarily focused on pattern recognition, and may be trained after processing multiple examples. The machine learning programs may include Bayesian program learning (BPL), automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about fire and smoke hazards from weather, emergency dispatch, NWS emergency alert, NOAA emergency alert, NOAA "Hazard Mapping System (HMS) Fire and Smoke Product" data or imagery, audible smoke alarm, and/or "smart home" telematics data, and/or other data.

Based upon these analyses, the processing element may learn how to identify characteristics and patterns that may then be applied to analyzing weather, emergency dispatch, NWS emergency alert, NOAA emergency alert, NOAA "Hazard Mapping System (HMS) Fire and Smoke Product" data or imagery, audible smoke alarm, and/or "smart home" telematics data, and/or other data. For example, the processing element may learn, with the user's permission or affirmative consent, to identify a smoke or fire hazard based upon minimal information or despite a misclassification provided by an input. The processing element may also learn how to identify different types of fire or smoke hazards based upon differences in the received sensor data.

EXEMPLARY EMBODIMENTS

In one aspect, a controller for controlling a heating, ventilation, and air conditioning (HVAC) system to mitigate smoke damage to a building may be provided. The controller may be in wired or wireless communication with the HVAC system, and the controller comprising one or more processors, sensors, and/or transceivers in communication with a memory device. The one or more processors, sensors, and/or transceivers may be programmed to: (1) receive an alert generated based upon a potential presence of smoke or fire in a location associated with the property (either interior or exterior to the property) via wireless communication or data transmission over one or more radio links or digital communication channels, the alert including, comprising, or embedded within, intelligent home telematics data collected or generated by one or more smart or other sensors mounted on the interior or exterior of the property; and/or (2) in response to receiving the alert (and/or intelligent home telematics data), deactivate an air circulation function of the HVAC system. Additionally or alternatively, the alert may be included or embedded within the intelligent home telematics data generated, transmitted, and/or analyzed. The controller may include additional, less, or alternate functionality, including that discussed elsewhere herein.

The alert and/or intelligent home telematics data may include data generated or collected by smart or other sensors mounted on the interior or exterior of a home. For instance, smoke, fire, ash, soot, audio, video, image, infrared, and/or other sensors may generate, collect, and transmit the home telematics data to a smart home controller for analysis to determine the presence or absence of smoke, fire, ash, or soot within a property or within the vicinity of a property.

Additionally or alternatively, the alert and/or intelligent home telematics data may include an emergency radio signal generated by an emergency service. The emergency signal and/or intelligent home telematics data may include a National Weather Service wildfire alert or other alert from the National Weather Service, the location associated with the property including a location exterior to the property. The National Weather Service wildfire alert may include an affected area, the one or more processors further programmed to determine that the affected area includes the property, and/or including analyzing wind speed and/or direction information to estimate a path and/or duration of the wildfire.

The National Weather Service wildfire alert may include an alert time period, and the one or more processors, sensors, and/or transceivers may be further programmed to: determine an end of the alert time period; and reactivate the air circulation function of the HVAC system at the end of the alert time period.

The emergency signal and/or intelligent home telematics data may include a fire alert from an emergency dispatch service, and the location associated with the property may include a location exterior to the property. The alert and/or intelligent home telematics data may include an audio signal generated by a smoke detector or fire detector within the property, and the location associated with the property may include an interior of the property. The audio signal may have a beginning and an end, and the one or more processors, sensors, and/or transceivers may be further programmed to: determine that a threshold amount of time has passed since the end of the audio signal; and reactivate the air circulation function of the HVAC system.

The one or more processors, sensors, and/or transceivers of the controller may be further programmed to deactivate at least one component of the HVAC system to deactivate the air circulation function. The one or more processors, sensors, and/or transceivers may be further configured to transmit a control signal to the at least one component to deactivate the at least one component. The one or more processors may be further configured to block transmission of power to the at least one component to deactivate the at least one component.

The at least one component may include a blower component of the HVAC system. The at least one component may include a heat exchanger of the HVAC system. The one or more processors may be further programmed to activate one or more dampers to deactivate the air circulation function. The alert and/or intelligent home telematics data may include a wireless alert signal generated by a smoke detector or fire detector within the property, and the location associated with the property may include an interior of the property.

The one or more processors, sensors, and/or transceivers of the controller may be further programmed to receive a first wireless control signal from a remote computing device, and deactivate the air circulation function in response to receiving the first wireless control signal. The one or more processors, sensors, and/or transceivers may be further programmed to: receive a second wireless control signal from the remote computing device, the second wireless control signal may indicate an absence of smoke in the location associated with the property; and in response to receiving the second wireless control signal, reactivate the air circulation function of the HVAC system.

The one or more processors, sensors, and/or transceivers of the controller may be further programmed to: listen for a particular wireless control signal from a remote computing device, the wireless control signal indicating a presence or absence of smoke or fire in the location associated with the property; and in response to receiving the wireless control signal, deactivate or reactivate, respectively, the air circulation function of the HVAC system.

The one or more processors, sensors, and/or transceivers of the controller may be further programmed to: analyze the intelligent home telematics data received to identify telematics data indicating a presence of smoke, fire, ash, and/or soot in the location associated with the property; and in response to receiving the wireless control signal and/or intelligent home telematics data, deactivate the air circulation function of the HVAC system.

The one or more processors, sensors, and/or transceivers of the controller may be further programmed to: analyze the intelligent home telematics data received to identify telematics data indicating an absence of smoke, fire, ash, and/or soot in the location associated with the property; and in response to receiving the wireless control signal and/or intelligent home telematics data, reactivate the air circulation function of the HVAC system.

The one or more processors, sensors, and/or transceivers of the controller may be further programmed to: analyze the intelligent home telematics data received to identify telematics data indicating a presence of wildfire in the vicinity of the property and/or moving toward the property; and in response to receiving the wireless control signal and/or intelligent home telematics data indicating the presence of wildfire in the vicinity of the property and/or moving toward the property, deactivate the air circulation function of the HVAC system.

The one or more processors, sensors, transceivers of the controller may be further programmed to: analyze the intelligent home telematics data received to identify telematics data indicating a presence of smoke, fire, ash, and/or soot in the location associated with the property, the intelligent home telematics data being collected or generated by sensors mounted on the exterior or interior of the property; and in response to receiving the wireless control signal and/or intelligent home telematics data, deactivate the air circulation function of the HVAC system.

In another aspect, a computer-implemented method of controlling a heating, ventilation, and air conditioning (HVAC) system to mitigate smoke and/or fire damage to a property may be provided. The method may be implemented using a controller in communication with the HVAC system. The method comprising: receiving via wireless communication or data transmission over one or more radio links or wireless communication channels, by the controller, an alert and/or intelligent home telematics data generated based upon a potential presence of smoke in a location associated with the property, the alert and/or intelligent home telematics data being collected, generated, or relayed by one or more smart or other sensors and/or transceivers mounted on the interior or exterior of the property; and in response to receiving the alert and/or intelligent home telematics data, deactivating, by the controller, an air circulation function of the HVAC system. The home telematics data may include data generated or collected smoke, fire, soot, ash, audio, video, visual, infrared, motion, and/or other sensors mounted about the property. The method may include additional, less, or alternate actions, including those discussed elsewhere herein.

In another embodiment, a computer-implemented method of controlling a heating, ventilation, and air conditioning (HVAC) system to mitigate smoke damage to a property is described. The method is implemented using a controller in communication with the HVAC system. The method comprises receiving, by the controller, an alert generated based upon a potential presence of at least one of smoke and fire in a location associated with the property, and in response to receiving the alert, deactivating, by the controller, an air circulation function of the HVAC system.

The method further includes receiving an alert generated by at least one of: (i) a device exterior to the property, and (ii) a device within the property and exterior to the HVAC system.

The method further includes receiving an alert generated by a device exterior to ductwork of the HVAC system.

The method further includes receiving an alert generated by at least one of: (i) a device exterior to the property, (ii) a device within the property and exterior to the HVAC system, and (iii) a device within the property and within the HVAC system.

The method further includes receiving smart home telematics data, analyzing the smart home telematics data received to identify any indicator of presence of at least one of smoke, fire, ash, and soot in the location associated with the property, and in response to identifying any indicator of the presence of the at least one of smoke, fire, ash, and soot, deactivating the air circulation function of the HVAC system.

The method further includes analyzing the smart home telematics data received to identify any indicator of absence of the at least one of smoke, fire, ash, and soot in the location associated with the property, and in response to identifying any indicator of the absence of the at least one of smoke, fire, and ash, soot, reactivating the air circulation function of the HVAC system.

The method further includes receiving the alert including an emergency alert from an emergency service.

The method further includes receiving a National Weather Service wildfire alert, the location associated with the property including a location exterior to the property.

The method further includes, wherein the National Weather Service wildfire alert includes an affected area, determining that the affected area includes the property.

The method further includes, wherein the National Weather Service wildfire alert includes an alert time period, determining an end of the alert time period, and reactivating the air circulation function of the HVAC system at the end of the alert time period.

The method further includes receiving smart home telematics data from one or more sensors associated with the property, analyzing the National Weather Service wildfire alert and the smart home telematics data to determine whether the wildfire is moving toward the property, and when the wildfire is moving toward the property, deactivating the air circulation function of the HVAC system.

The method further includes receiving smart home telematics data including receiving at least one of wind speed data and wind direction data.

The method further includes receiving the emergency alert including receiving the emergency alert from a signal hub.

The method further includes receiving a fire alert from an emergency dispatch service, wherein the location is associated with the property including a location exterior to the property.

The method further includes receiving the alert comprising an audio signal generated by a smoke detector within the property, wherein the location is associated with the property including an interior of the property.

The method further includes receiving the audio signal having a beginning and an end, determining that a threshold amount of time has passed since the end of the audio signal, and reactivating the air circulation function of the HVAC system.

The method of claim 31, wherein deactivating an air circulation function of an HVAC system comprises deactivating at least one component of the HVAC system.

The method further includes deactivating at least one component of the HVAC system including transmitting a deactivation control signal to the at least one component.

The method further includes deactivating at least one component of the HVAC system including blocking transmission of power to the at least one component.

The method further includes deactivating at least one component of the HVAC system including deactivating at least one of a blower component of the HVAC system and a heat exchanger of the HVAC system.

The method further includes deactivating an air circulation function of an HVAC system including activating one or more dampers within ductwork of the HVAC system.

The method further includes deactivating one or more components of the property that circulate air within the property.

The method further includes deactivating one or more components of the property including deactivating at least one of an exhaust fan and a vented appliance.

The method further includes receiving an alert including receiving a wireless alert signal generated by a smoke detector within the property, wherein the location is associated with the property including an interior of the property.

The method further includes receiving a first wireless control signal from a remote computing device, and, in response to receiving the first wireless control signal, deactivating the air circulation function of the HVAC system.

The method further includes receiving a second wireless control signal from the remote computing device, the second wireless control signal indicating an absence of smoke in the location associated with the property, and in response to receiving the second wireless control signal, reactivating the air circulation function of the HVAC system.

In another embodiment, at least one non-transitory computer-readable storage medium having computer-executable instructions embodied thereon is described. Wherein when executed by at least one processor of a controller in communication with a heating, ventilation, and air conditioning (HVAC) system of a property, the computer-executable instructions cause the at least one processor to receive an alert generated based upon a potential presence of at least one of smoke and fire in a location associated with the property, and in response to receiving the alert, deactivate an air circulation function of the HVAC system.

The non-transitory computer-readable storage medium further includes an alert generated by at least one of: (i) a device exterior to the property, and (ii) a device within the property and exterior to the HVAC system.

The non-transitory computer-readable storage medium further includes the HVAC system including ductwork, and the device within the property and exterior to the HVAC system is exterior to the ductwork of the HVAC system.

The non-transitory computer-readable storage medium further includes an alert generated by at least one of: (i) a device exterior to the property, (ii) a device within the property and exterior to the HVAC system, and (iii) a device within the property and within the HVAC system.

The non-transitory computer-readable storage medium further includes the alert being generated by one or more sensors associated with the property and in communication with the controller.

The non-transitory computer-readable storage medium further includes the one or more sensors comprise one or more smart sensors.

The non-transitory computer-readable storage medium further includes the one or more sensors being mounted to the property.

The non-transitory computer-readable storage medium further includes the alert including smart home telematics data.

The non-transitory computer-readable storage medium further includes the computer-executable instructions further causing the at least one processor to analyze the smart home telematics data received to identify any indicator of presence of at least one of smoke, fire, ash, and soot in the location associated with the property, and in response to identifying any indicator of the presence of the at least one of smoke, fire, ash, and soot, deactivate the air circulation function of the HVAC system.

The non-transitory computer-readable storage medium further includes the computer-executable instructions further causing the at least one processor to analyze the smart home telematics data received to identify any indicator of absence of the at least one of smoke, fire, ash, and soot in the location associated with the property, and in response to identifying any indicator of the absence of the at least one of smoke, fire, ash, and soot, reactivate the air circulation function of the HVAC system.

The non-transitory computer-readable storage medium further includes the alert including an emergency alert from an emergency service.

The non-transitory computer-readable storage medium further includes the emergency alert including a National Weather Service wildfire alert, and the location is associated with the property including a location exterior to the property.

The non-transitory computer-readable storage medium further includes the National Weather Service wildfire alert including an affected area, and the one or more processors further programmed to determine that the affected area includes the property.

The non-transitory computer-readable storage medium further includes the National Weather Service wildfire alert including an alert time period, and wherein the computer-executable instructions further cause the at least one processor to determine an end of the alert time period, and reactivate the air circulation function of the HVAC system at the end of the alert time period.

The non-transitory computer-readable storage medium further includes the computer-executable instructions further causing the at least one processor to receive smart home telematics data from one or more sensors associated with the property, analyze the National Weather Service wildfire alert and the smart home telematics data to determine whether the wildfire is moving toward the property, and when the wildfire is moving toward the property, deactivate the air circulation function of the HVAC system.

The non-transitory computer-readable storage medium further includes smart home telematics data that includes at least one of wind speed data and wind direction data.

The non-transitory computer-readable storage medium further includes the emergency alert including a fire alert from an emergency dispatch service, wherein the location is associated with the property including a location exterior to the property.

The non-transitory computer-readable storage medium further includes the alert including an audio signal generated by a smoke detector within the property, wherein the location is associated with the property including an interior of the property.

The non-transitory computer-readable storage medium further includes the audio signal having a beginning and an end, and wherein the computer-executable instructions further cause the at least one processor to determine that a threshold amount of time has passed since the end of the audio signal, and reactivate the air circulation function of the HVAC system.

The non-transitory computer-readable storage medium further includes the computer-executable instructions further causing the at least one processor to deactivate at least one component of the HVAC system to deactivate the air circulation function.

The non-transitory computer-readable storage medium further includes the computer-executable instructions further causing the at least one processor to transmit a control signal to the at least one component to deactivate the at least one component.

The non-transitory computer-readable storage medium further includes the computer-executable instructions further causing the at least one processor to block transmission of power to the at least one component to deactivate the at least one component.

The non-transitory computer-readable storage medium further includes the at least one component having at least one of a blower component of the HVAC system and a heat exchanger of the HVAC system.

The non-transitory computer-readable storage medium further includes the computer-executable instructions further causing the at least one processor to activate one or more dampers to deactivate the air circulation function.

The non-transitory computer-readable storage medium further includes the computer-executable instructions further causing the at least one processor to deactivate one or more components of the property that circulate air within the property.

The non-transitory computer-readable storage medium further includes the one or more components of the property including at least one of an exhaust fan and a vented appliance.

The non-transitory computer-readable storage medium further includes the alert including a wireless alert signal generated by a smoke detector within the property, wherein the location is associated with the property including an interior of the property.

The non-transitory computer-readable storage medium further includes the computer-executable instructions further causing the at least one processor to receive a first wireless control signal from a remote computing device, and in response to receiving the first wireless control signal, deactivate the air circulation function of the HVAC system.

The non-transitory computer-readable storage medium further includes the computer-executable instructions further causing the at least one processor to receive a second wireless control signal from the remote computing device, the second wireless control signal indicating an absence of smoke in the location associated with the property, and in response to receiving the second wireless control signal, reactivate the air circulation function of the HVAC system.

Additional Features

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this patent application are not intended to be construed under 35 U.S.C. § 112(f) unless traditional means-plus-function language is expressly recited, such as "means for" or "step for" language being explicitly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A controller for controlling a heating, ventilation, and air conditioning (HVAC) system to mitigate smoke damage to a property, the controller in communication with the HVAC system, the controller comprising one or more processors in communication with a memory device, the one or more processors programmed to:
receive an alert indicating a presence of smoke in a location associated with the property, the alert including an emergency alert from an emergency service;
receive telematics data from one or more sensors associated with the property;
analyze the alert and the telematics data to determine movement of the smoke towards the property; and
in response to determining said movement, deactivate an external air circulation function of the HVAC system.

2. The controller of claim 1, wherein the alert includes an alert generated by at least one of: (i) a device exterior to the property, and (ii) a device within the property and exterior to the HVAC system.

3. The controller of claim 2, wherein the HVAC system includes ductwork, and the device within the property and exterior to the HVAC system is exterior to the ductwork of the HVAC system.

4. The controller of claim 1, wherein the alert includes an alert generated by at least one of: (i) a device exterior to the property, (ii) a device within the property and exterior to the HVAC system, and (iii) a device within the property and within the HVAC system.

5. The controller of claim 1, wherein the alert is generated by one or more sensors associated with the property and in communication with the controller.

6. The controller of claim 5, wherein the one or more sensors comprise one or more smart sensors.

7. The controller of claim 5, wherein the one or more sensors are mounted to the property.

8. The controller of claim 1, wherein the alert includes smart home telematics data.

9. The controller of claim 8, wherein the one or more processors are further programmed to:
analyze the smart home telematics data received to identify any indicator of presence of at least one of the smoke, fire, ash, and soot in the location associated with the property; and
in response to identifying any indicator of the presence of at least one of the smoke, the fire, the ash, and the soot, deactivate the air circulation function of the HVAC system.

10. The controller of claim 9, wherein the one or more processors are further programmed to:
analyze the smart home telematics data received to identify any indicator of absence of at least one of the smoke, the fire, the ash, and the soot in the location associated with the property; and
in response to identifying any indicator of the absence of at least one of the smoke, the fire, the ash, and the soot, reactivate the air circulation function of the HVAC system.

11. The controller of claim 1, wherein the one or more processors receive the alert over at least one of: (i) one or more radio links, (ii) one or more digital communication channels, and (iii) one or more wired data communication channels.

12. The controller of claim 1, wherein the alert includes a National Weather Service wildfire alert identifying a wildfire in the location associated with the property, the location associated with the property including a location exterior to the property.

13. The controller of claim 12, wherein the National Weather Service wildfire alert includes an affected area, the one or more processors further programmed to determine that the affected area includes the property.

14. The controller of claim 12, wherein the National Weather Service wildfire alert includes an alert time period, the one or more processors further programmed to:
determine an end of the alert time period; and
reactivate the air circulation function of the HVAC system at the end of the alert time period.

15. The controller of claim 12, wherein the one or more processors are further programmed to:
receive telematics data including smart home telematics data from one or more sensors associated with the property, wherein the property includes a smart home located on the property;
analyze the National Weather Service wildfire alert and the smart home telematics data to determine whether the wildfire is moving toward the property; and
when the wildfire is moving toward the property, deactivate the air circulation function of the HVAC system.

16. The controller of claim 15, wherein the smart home telematics data includes at least one of wind speed data and wind direction data.

17. The controller of claim 1, wherein the alert includes a fire alert generated by an emergency dispatch service, the location associated with the property including a location exterior to the property.

18. The controller of claim 1, wherein the alert includes an audio signal generated by a smoke detector within the property, the location associated with the property including an interior of the property.

19. The controller of claim 18, wherein the audio signal has a beginning and an end, the one or more processors further programmed to:
determine that a threshold amount of time has passed since the end of the audio signal; and
reactivate the air circulation function of the HVAC system.

20. A computer-implemented method of controlling a heating, ventilation, and air conditioning (HVAC) system to mitigate smoke damage to a property, the method implemented using a controller in communication with the HVAC system, the method comprising:
receiving, by the controller, an alert indicating a presence of smoke in a location associated with the property, the alert including an emergency alert from an emergency service;
receiving telematics data from one or more sensors associated with the property;
analyzing the alert and the telematics data to determine movement of the smoke is moving towards the property; and
in response to determining said movement, deactivating, by the controller, an external air circulation function of the HVAC system.

* * * * *